(12) United States Patent
Gao et al.

(10) Patent No.: US 10,827,473 B2
(45) Date of Patent: Nov. 3, 2020

(54) DOWNLINK CONTROL INFORMATION (DCI) TRANSMISSION METHOD AND DEVICE

(71) Applicant: China Academy of Telecommunications Technology, Beijing (CN)

(72) Inventors: Xuejuan Gao, Beijing (CN); Xueming Pan, Beijing (CN); Fang-Chen Cheng, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 122 days.

(21) Appl. No.: 15/776,772

(22) PCT Filed: Jan. 11, 2017

(86) PCT No.: PCT/CN2017/070901
§ 371 (c)(1),
(2) Date: May 16, 2018

(87) PCT Pub. No.: WO2017/084641
PCT Pub. Date: May 26, 2017

(65) Prior Publication Data
US 2018/0338301 A1    Nov. 22, 2018

(30) Foreign Application Priority Data

Nov. 16, 2015 (CN) .......................... 2015 1 0784698

(51) Int. Cl.
*H04W 72/04* (2009.01)
*H04L 1/16* (2006.01)
(Continued)

(52) U.S. Cl.
CPC ............. *H04W 72/042* (2013.01); *H04L 1/16* (2013.01); *H04L 1/1896* (2013.01); *H04L 5/001* (2013.01);
(Continued)

(58) Field of Classification Search
CPC .......... H04W 72/042; H04W 72/0446; H04W 72/1278; H04W 72/1289; H04W 72/14; H04L 5/0053; H04L 5/001
See application file for complete search history.

(56) References Cited

U.S. PATENT DOCUMENTS

2013/0336160 A1* 12/2013 Yin ...................... H04L 1/1854
                                                                370/254
2015/0117275 A1*  4/2015 Park ..................... H04L 1/1812
                                                                370/280
2018/0323938 A1* 11/2018 Takeda .................. H04W 28/04

FOREIGN PATENT DOCUMENTS

CN        101951684 A       1/2011
CN        101958778 A       1/2011
(Continued)

OTHER PUBLICATIONS

Author Unknown, 3rd Generation Partnership Project, Technical Specification Group Radio Access Network, Evolved Universal Terrestrial Radio Access (E-UTRA), Physical layer procedures (Release 10), Doc No. TS 36.213, pp. 1-128, Jun. 2015 (Year: 2015).*

(Continued)

*Primary Examiner* — Christopher M Crutchfield
(74) *Attorney, Agent, or Firm* — Foley & Lardner LLP

(57) ABSTRACT

The present invention relates to the technical field of communications, and relates in particular to a downlink control information (DCI) transmission method and device, the DCI transmission method comprising: confirming information used indicating a bit number of a first indication field within DCI, the information comprising high layer signalling configuration information or information for whether to configure an unauthorized member carrier; according to the high layer signalling configuration information or the information for whether to configure an unauthorized member carrier, (Continued)

determining the bit number of the first indication field included in the DCI. The bit number of the first indication field included in the DCI is determined according to high layer signalling configuration or whether an unauthorized member carrier is configured, the bit number of the first indication field within the DCI is thereby set in a reasonable manner according to specific requirements, and a user device and a base station understand a dynamically determined ACK/NACK sequence of feedback information in a consistent manner within different scenarios.

16 Claims, 14 Drawing Sheets

(51) Int. Cl.
    *H04L 1/18*     (2006.01)
    *H04L 5/00*     (2006.01)
    *H04L 27/00*     (2006.01)

(52) U.S. Cl.
    CPC .......... *H04L 5/0048* (2013.01); *H04L 5/0055* (2013.01); *H04L 27/0006* (2013.01); *H04L 5/0098* (2013.01)

(56) References Cited

FOREIGN PATENT DOCUMENTS

| | | |
|---|---|---|
| CN | 102025467 A | 4/2011 |
| CN | 103326806 A | 9/2013 |
| CN | 103650393 A | 3/2014 |
| WO | W)2013/129207 * | 9/2013 |
| WO | WO 2014/180001 A1 | 11/2014 |

OTHER PUBLICATIONS

Author Unknown, The number of bits in a binary representation of an integer, p. 1, Apr. 15, 2015 (Year: 2015).*

Author Unknown, R1-156129, Summary of email discussion [82-03]: HARQ-ACK codebook determination, pp. 1-14, Oct. 9, 2015 (Year: 2015).*

Author Unknown, Remaining issues for dynamic HARQ-ACK codebook determination, Doc. No. R1-156452, pp. 1-11, Nov. 22, 2015 (Year: 2015).*

Author Unknown, Detailed solution for dynamic HARQ-ACK Codebook determination, Doc. No. R1-155092, pp. 1-16, Oct. 9, 2015 (Year: 2015).*

Author Unknown, Solutions for Homework 2, pp. 1-7, Retrieved from the internet Archive, www.archive.org, as archived on Feb. 15, 2010 (Year: 2010).*

R1-112532 3GPP TSG-RAN WG1 Meeting #66, Athens, Greece, Aug. 22-26, 2011.

Huawei et al: "Detailed solution for dynamic HARQ-ACK Codebook determination", 3GPP Draft; R1-155092, $3^{rd}$ Generation Partnership Project (3GPP), Mobile Competence Centre; 650, Route Des Lucioles ; F-06921 Sophia-Antipolex Cedex; France, vol. RAN WG1, No. Malmo, Sweden; Oct. 5, 2015-Oct. 9, 2015 DTD Sep. 26, 2015.

Potevio: "Dynamic HARQ-ACK codebook determination in Rel-13 CA", 3GPP Draft: R1-157290, $3^{rd}$ Generation Partnership Project (3GPP), Mobile Competence Centre; 650, Route Des Lucioles ; F-06921 Sophia-Antipolis Cedex; France, vol. RAN WG1, No. Anaheim, USA Nov. 105, 2015-Nov. 22, 2015 DTD Nov. 15, 2015.

* cited by examiner

DOWNLINK CONTROL INFORMATION (DCI) TRANSMISSION METHOD AND DEVICE

This application is a National Stage of International Application No. PCT/CN2017/070901, filed on Jan. 11, 2017, which claims priority to Chinese Patent Application No. 201510784698.5, filed with the Chinese Patent Office on Nov. 16, 2015, and entitled "A method and apparatus for transmitting Downlink Control Information (DCI)", which are hereby incorporated by reference in their entireties for all purposes entirety.

FIELD

The present invention relates to the field of communications, and particularly to a method and apparatus for transmitting Downlink Control Information (DCI).

BACKGROUND

Aggregation of at most five carriers is supported in the technology of Carrier Aggregation (CA) in the Long Term Evolution Advanced (LTE-A) Release 10 (Rel-10). An evolved Node B (eNB) semi-statically configures Component Carriers (CCs) to be aggregated for respective User Equipments (UEs), where the configured component carriers can be further categorized into activated component carriers and deactivated component carriers, and the eNB only schedules data to be transmitted over the activated component carriers. If a UE determines the total number of pieces of Acknowledgment (ACK)/Non-Acknowledgement (NACK) feedback information according to the number of activated component carriers, the eNB and the UE may have different understanding of the total number of pieces of ACK/NACK feedback information while the component carriers are being activated and deactivated, so that the ACK/NACK feedback information may be not received correctly. In view of this, the UE typically determines the length of a sequence of feedback information according to the number of configured CCs as specified in the LTE Rel-10. As illustrated in FIG. 1, the eNB configures the UE with three Downlink (DL) component carriers, which are a DL CC1, a DL CC2, and a DL CC3 respectively, where two of the component carriers, DL CC1 and DL CC2, are activated, one of the component carriers, DL CC1, is scheduled in some sub-frame, and if a multi-Transport Block (TB) transport mode is configured, and there are at most two TBs to be transmitted in each Physical Downlink Shared Channel (PDSCH), then the UE will transmit a sequence of ACK/NACK feedback information with the length of 6 to the eNB, where the ACK/NACK feedback information includes b1 to b6 respectively; and the feedback information corresponding to the activated but unscheduled component carrier DL CC2, and the deactivated component carrier DL CC3 is set to NACK.

Aggregation of at most 32 carriers is supported in the technology of carrier aggregation in the LTE-A Rel-13. As the number of aggregated carriers is growing, there are also a growing number of pieces of ACK/NACK feedback information to be transmitted by a UE. If the length of a sequence of feedback information is still determined according to the number of configured component carriers, then when the eNB configures the UEs with a large number of component carriers, and there are a small number of really activated component carriers, or a small number of really scheduled component carriers, there may be a lot of redundant information in a sequence of ACK/NACK feedback information. A UE has to transmit a lot of ACK/NACK feedback information at high transmit power over a large number of physical resources, thus degrading both the performance of transmitting the ACK/NACK feedback information, and the utilization ratio of the resources throughout the system. In view of this, a method for determining dynamically a sequence of ACK/NACK feedback information has been proposed.

In the method for determining dynamically a sequence of ACK/NACK feedback information, a count indicating field (referred below to as a first indicating field) indicating the total number of Physical Downlink Control Channels (PDCCHs)/Enhanced Physical Downlink Control Channels (EPDCCHs) transmitted till the current sub-frame, and a total number of bits indicating field indicating a length of ACK/NACK feedback information are added to Downlink Control Information (DCI) to thereby adjust dynamically the length of a sequence of ACK/NACK feedback information. The PDCCHs/EPDCCHs here include PDCCHs/EPDCCHs with corresponding PDSCHs, and PDCCHs/EPDCCHs indicating downlink Semi-Persistent Scheduling (SPS) resource release. The first indicating field above actually reflects the total number of data packets, for which ACK/NACK is to be fed back, transmitted in a feedback window till the current sub-frame, where the feedback window is a set of downlink sub-frames/downlink carriers, for which ACK/NACK is to be fed back in the same uplink sub-frame, determined according to an ACK/NACK feedback timing relationship.

In the Frequency Division Duplex (FDD) mode, both the first indicating field and the total number of bits indicating field are provided by newly adding a number of additional bits to the existing DCI; and in the Time Division Duplex (TDD) mode, a DAI indicating field in the existing DCI can be reused as a part or all of the first indicating field, and the total number of bits indicating field is provided by newly adding a number of additional bits to the existing DCI.

As illustrated in FIG. 2, in the TDD mode, for example, there is a 2-bit Downlink Assignment Index (DAI) count indicator in DCI, where accumulative counting is made in a sub-frame in an order of ascending component carrier numbers, and in a firstly frequency and then time order, and the DAI count indicator is cycled when the two bits are overrun.

ACK/NACK feedback information of different sub-frames and different carriers in the feedback window can be sorted as per the DAI count indicator, e.g., $b_{cc1,sf1}$, $b_{cc3,sf1}$, $b_{cc5,sf1}$, $b_{cc2,sf2}$, $b_{cc3,sf2}$, $b_{cc4,sf2}$, $b_{cc1,sf3}$, $b_{cc2,sf3}$, $b_{cc3,sf3}$ in FIG. 2; and furthermore when the length of a sequence of ACK/NACK feedback information generated according to the DAI sorting is smaller than the length of ACK/NACK feedback information sequence indicated in the total number of bits indicating field, place-holding information (e.g., NACK) is supplemented at the tail of the sequence so that the length of the sequence is equal to the length of ACK/NACK feedback information sequence indicated in the total number of bits indicating field.

In the example above, since there are only two bits in the first indicating field, when there are four pieces of consecutively counted data lost, such an error may occur that the eNB and the UE have different understanding of the sequence of ACK/NACK feedback information. As illustrated in FIG. 3, the UE side cannot determine from the first indicating field that there are four pieces of intermediate data lost, but generates ACK/NACK of the CC1 in a sub-frame 1, and ACK/NACK of the CC1, the CC2, and the CC3 in a sub-frame 3 directly in the indication order of the first indicating field, and supplements following NACK until the indicated length of ACK/NACK feedback information sequence is satisfied as if there were no data lost, and the eNB parses the sequence of ACK/NACK feedback information in the indication order of the first indicating field, thus resulting in misunderstanding. Generally in a system of aggregated carriers, all of which are licensed component carriers, it is rare for four pieces of data to be lost consecutively, but in a Licensed Assisted Access (LAA) scenario, unlicensed component carriers are aggregated with licensed component carriers, a channel is preempted for the unlicensed component carriers in the Listen Before Talk (LBT) mode, but it is necessary to generate in advance the information in the first indicating field; if no channel is preempted in some sub-frame or for some carrier, then the eNB will not transmit any data in the sub-frame or over the carrier, but the sub-frame or the carrier for which no channel is preempted is counted in the first indicating field, so the UE frequently fails consecutively to receive four and even more pieces of data.

As can be apparent, there are different demands for the number of bits in the first indicating field in different scenarios, but there has been absent in the prior art a solution to address this issue.

SUMMARY

Embodiments of the invention provide a method and apparatus for transmitting DCI so as to satisfy a demand for the number of bits in a first indicating field in DCI in different scenarios.

An embodiment of the invention provides a method for transmitting Downlink Control Information (DCI), the method including:

determining information indicating a number of bits in a first indicating field in DCI, wherein the information includes configuration information in higher-layer signaling, or information about whether there is an unlicensed component carrier configured; and the first indicating field indicates the sum of the total number of Physical Downlink Control Channels (PDCCHs)/Enhanced Physical Downlink Control Channels (EPDCCHs), with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame; and determining the number of bits in the first indicating field in the DCI according to the configuration information in the higher-layer signaling, or the information about whether there is an unlicensed component carrier configured.

Optionally the method includes:

receiving the DCI, with the first indicating field including the number of bits, transmitted by the eNB, and generating and feeding the Acknowledgement (ACK)/Non-Acknowledgement (NACK) information back to the eNB according to the first indicating field in the DCI.

Optionally the configuration information in the higher-layer signaling includes $\lceil \log_2 A \rceil$ bits of higher-layer signaling indicating the number of bits in the first indicating field, wherein the number of bits in the first indicating field is one of A numbers of bits, and A is a positive integer.

Optionally a maximum one of the A numbers of bits is $\lceil \log_2 N \times M \times C \rceil$, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or a maximum one of the A numbers of bits is $$\left\lceil \log_2 M \times \sum_{i=1}^{N} C_i \right\rceil,$$

wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the configuration information in the higher-layer signaling includes:

K-bit higher-layer signaling indicating the number P of bits in the first indicating field;

wherein K is 3, and P is one of the positive integers 1 to 8; or

K is 3, and P is one of the positive integers 2 to 8; or

K is 3, and P is one of the positive integers 2 to 7; or

K is 2, and P is one of positive integers x1, x2, x3, and x4, wherein x1, x2, x3, and x4 are any four of the positive integers 1 to 8; or K is 1, and P is one of positive integers x1', and x2', wherein x1' and x2' are any two of the positive integers 1 to 8.

Optionally the determining information indicating the number of bits in the first indicating field in the DCI according to the information about whether there is an unlicensed component carrier configured includes:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the method includes:

when a plurality of carrier groups are configured, determining the number of bits in the first indicating field in the DCI of each carrier group respectively as in one of the ways as described above.

Optionally when the values of M are different for different uplink sub-frames and/or different component carriers, the maximum one of the respective values of M is taken.

Optionally the higher-layer signaling is Radio Resource Control (RRC) signaling or Media Access Control (MAC) signaling.

Another embodiment of the invention provides a method for transmitting Downlink Control Information (DCI), the method including:

determining a number of bits in a first indicating field in DCI, and transmitting higher-layer signaling to a UE, wherein the higher-layer signaling carries configuration information indicating the number of bits in the first indicating field in the DCI, or determining the number of bits in a first indicating field in DCI according to whether the UE is configured with information about an unlicensed component carrier, wherein the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame.

An embodiment of the invention provides an apparatus for transmitting Downlink Control Information (DCI), the apparatus including:

a first processing module configured to determine information indicating the number of bits in a first indicating field in DCI, wherein the information includes configuration information in higher-layer signaling, or information about whether there is an unlicensed component carrier configured; and the first indicating field indicates the sum of the total number of Physical Downlink Control Channels (PDCCHs)/Enhanced Physical Downlink Control Channels (EPDCCHs), with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame; and a second processing module configured to determine the number of bits in the first indicating field in the DCI according to the configuration information in the higher-layer signaling, or the information about whether there is an unlicensed component carrier configured.

Another embodiment of the invention provides an apparatus for transmitting Downlink Control Information (DCI), the apparatus including:

a configuring module configured to configure the number of bits in a first indicating field in DCI, and to indicate the number of bits in the first indicating field to a transmitting module; and the transmitting module configured to transmit higher-layer signaling to a UE, wherein the higher-layer signaling carries configuration information indicating the number of bits in the first indicating field in the DCI;

or the apparatus includes:

a first processing module configured to determine whether a UE is configured with information about an unlicensed component carrier; and a second processing module configured to determine the number of bits in a first indicating field in DCI according to whether the UE is configured with information about an unlicensed component carrier, wherein the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame.

An embodiment of the invention provides a third transmitting apparatus including:

a processor configured to read and execute program in a memory:

to determine information indicating a number of bits in a first indicating field in DCI, wherein the information includes configuration information in higher-layer signaling, or information about whether there is an unlicensed component carrier configured; and the first indicating field indicates the sum of the total number of Physical Downlink Control Channels (PDCCHs)/Enhanced Physical Downlink Control Channels (EPDCCHs), with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame; and to determine the number of bits in the first indicating field in the DCI according to the configuration information in the higher-layer signaling, or the information about whether there is an unlicensed component carrier configured.

An embodiment of the invention provides a fourth transmitting apparatus including:

a processor configured to read and execute program in a memory:

to determine a number of bits in a first indicating field in DCI, and to transmit higher-layer signaling to a UE through a transceiver, wherein the higher-layer signaling carries configuration information indicating the number of bits in the first indicating field in the DCI, or to determine the number of bits in a first indicating field in DCI according to whether the UE is configured with information about an unlicensed component carrier, wherein the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame; and the transceiver configured to be controlled by the processor 1304 to receive and transmit data.

In the embodiments of the invention, the number of bits in the first indicating field in the DCI can be determined as configured via the higher-layer signaling, or according to whether there is an unlicensed component carrier configured, so that the number of bits in the first indicating field in the DCI can be reasonably set particularly as needed, so that the UE and the eNB can have consistent understanding of a dynamically determined sequence of ACK/NACK feedback information in different scenarios.

DETAILED DESCRIPTION OF THE EMBODIMENTS

The embodiments of the invention will be described below in further details with reference to the drawings. An implementation in which the number of bits in a first indicating field is determined as configured via higher-layer signaling will be introduced in a first embodiment, and an implementation in which the number of bits in a first indicating field is determined according to whether unlicensed component carriers are configured will be introduced in a second embodiment.

First Embodiment

Figure 1:
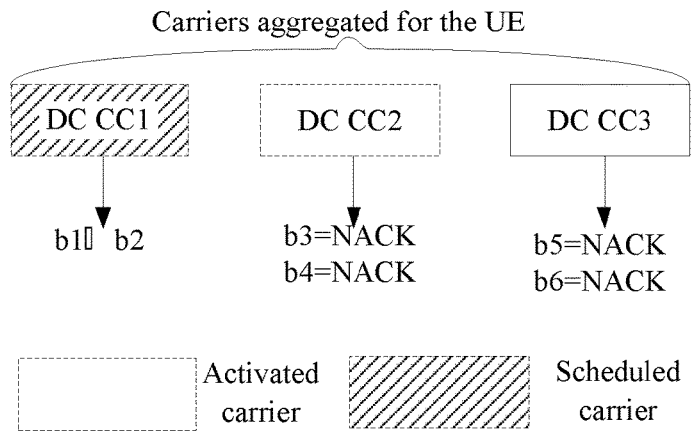
FIG. 1 is a schematic diagram of generating a sequence of ACK/NACK feedback information according to the number of configured component carriers.
Figure 2:
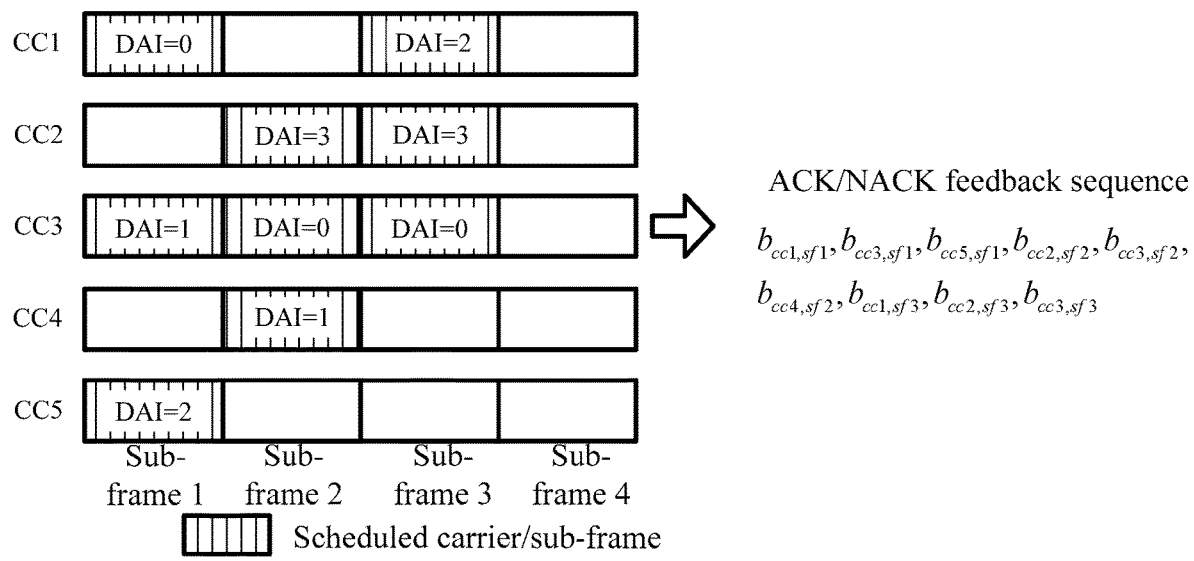
FIG. 2 is a schematic diagram of determining dynamically a sequence of ACK/NACK feedback information according to a first indicating field in DCI.
Figure 3:
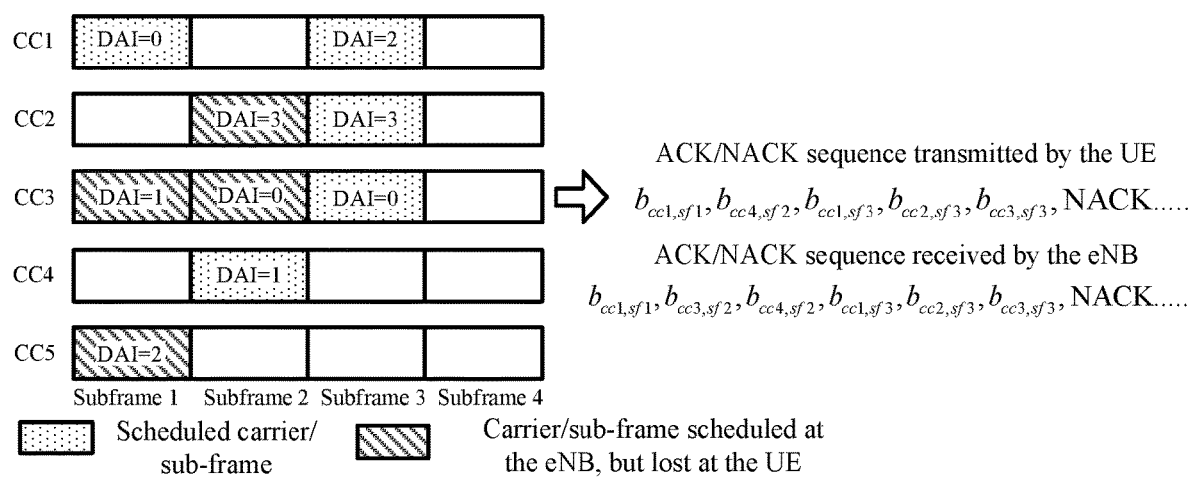
FIG. 3 is a schematic diagram of generating a sequence of ACK/NACK feedback information when there is data lost.
Figure 4:
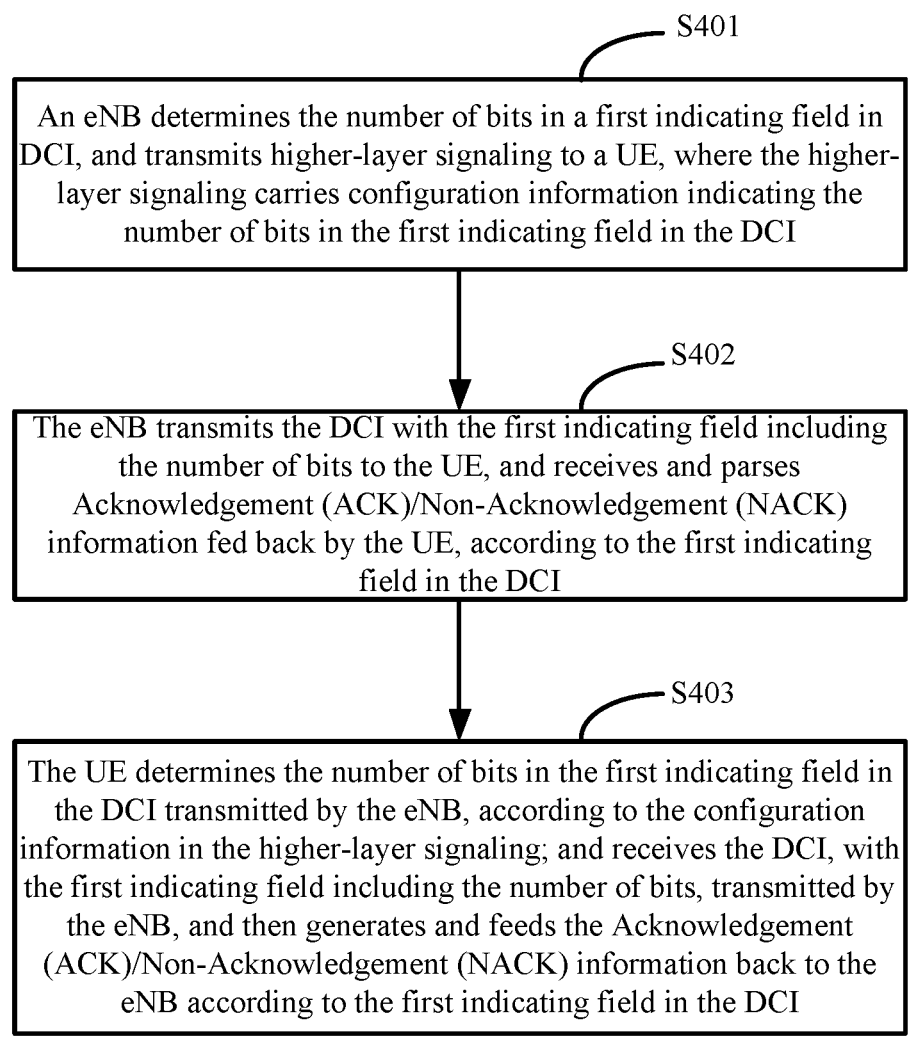
FIG. 4 is a flow chart of a method for transmitting DCI according to a first embodiment of the invention.

FIG. 4 illustrates a flow chart of a method for transmitting DCI according to a first embodiment of the invention, where the method includes the following steps.

In the step S401, an eNB determines the number of bits in a first indicating field in DCI, and transmits higher-layer signaling to a UE, where the higher-layer signaling carries configuration information indicating the number of bits in the first indicating field in the DCI; and the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame.

Here the higher-layer signaling can be Radio Resource Control (RRC) signaling or Medium Access Control (MAC) signaling.

The PDCCH/EPDCCH means that the downlink control channel may be a non-enhanced PDCCH or an Enhanced Physical Downlink Control Channel (EPDCCH). There may be an EPDCCH in a preconfigured EPDCCH sub-frame, so the eNB transmits an EPDCCH, and the UE receives an EPDCCH; and there may be a PDCCH in another sub-frame, so the eNB transmits a PDCCH, and the UE receives an EPDCCH, so all of the PDCCHs/EPDCCHs, satisfying the condition above, transmitted in the same feedback window shall be counted in the first indicating field. If all of the sub-frames in the feedback window are EPDCCH sub-frames, then the eNB will only transmits an EPDCCH, and the UE will only receive an EPDCCH, so the first indicating field indicates the total number of EPDCCHs, with corresponding PDSCHs (i.e., EPDCCHs for scheduling the respective PDSCHs to be transmitted), transmitted till the current sub-frame, and the number of EPDCCHs indicating downlink Semi-Persistent Scheduling (SPS) resource release; if none of the sub-frames in the feedback window is an EPDCCH sub-frame, then the eNB will only transmit a PDCCH, and the UE will only receive a PDCCH, so the first indicating field indicates the total number of PDCCHs, with corresponding PDSCHs, transmitted till the current sub-frame, and the number of PDCCHs indicating downlink Semi-Persistent Scheduling (SPS) resource release; if the sub-frames in the feedback window include EPDCCH sub-frames and non-EPDCCH sub-frames, then the eNB will transmit an EPDCCH in an EPDCCH sub-frame, and transmit a PDCCH in a non-EPDCCH sub-frame, and the UE will receive an EPDCCH in an EPDCCH sub-frame, and receive a PDCCH in a non-EPDCCH sub-frame, so the first indicating field indicates the total number of EPDCCHs and PDCCHs, with corresponding PDSCHs, transmitted till the current sub-frame, and the number of EPDCCHs and PDCCHs indicating downlink Semi-Persistent Scheduling (SPS) resource release, or the first indicating field indicates the total number of EPDCCHs, with corresponding PDSCHs, transmitted till the current sub-frame, and the number of EPDCCHs and PDCCHs indicating downlink Semi-Persistent Scheduling (SPS) resource release, or the first indicating field indicates the total number of PDCCHs, with corresponding PDSCHs, transmitted till the current sub-frame, and the number of EPDCCHs and PDCCHs indicating downlink Semi-Persistent Scheduling (SPS) resource release, or the first indicating field indicates the total number of EPDCCHs and PDCCHs, with corresponding PDSCHs, transmitted till the current sub-frame, and the number of EPDCCHs indicating downlink Semi-Persistent Scheduling (SPS) resource release, or the first indicating field indicates the total number of EPDCCHs and PDCCHs, with corresponding PDSCHs, transmitted till the current sub-frame, and the number of PDCCHs indicating downlink Semi-Persistent Scheduling (SPS) resource release, or the first indicating field indicates the total number of EPDCCHs, with corresponding PDSCHs, transmitted till the current sub-frame, and the number of PDCCHs indicating downlink Semi-Persistent Scheduling (SPS) resource release, or the first indicating field indicates the total number of PDCCHs, with corresponding PDSCHs, transmitted till the current sub-frame, and the number of EPDCCHs indicating downlink Semi-Persistent Scheduling (SPS) resource release, particularly dependent upon whether both an EPDCCH and a PDCCH can instruct an SPS resource release, and whether both an EPDCCH and a PDCCH can schedule a PDSCH, in the feedback window; and the feedback window above represents a set of downlink sub-frames/carriers for which ACK/NACK is to be fed back in the same uplink sub-frame. "Till the current sub-frame" refers to a period of time from a sub-frame where counting starts, till the current sub-frame (including the current sub-frame).

In the step S402, the eNB transmits the DCI with the first indicating field including the number of bits to the UE, and receives and parses Acknowledgement (ACK)/Non-Acknowledgement (NACK) information fed back by the UE, according to the first indicating field in the DCI.

In the step S403, the UE determines the number of bits in the first indicating field in the DCI transmitted by the eNB, according to the configuration information in the higher-layer signaling; and receives the DCI, with the first indicating field including the number of bits, transmitted by the eNB, and then generates and feeds the Acknowledgement (ACK)/Non-Acknowledgement (NACK) information back to the eNB according to the first indicating field in the DCI.

In the step above, the configuration information in the higher-layer signaling can include the number of bits in the first indicating field, indicated in $\lceil \log_2 A \rceil$ bits of higher-layer signaling, where the number of bits in the first indicating field is one of A numbers of bits, and A is a positive integer.

Here $\lceil \ \rceil$ represents rounding up. The eNB can configure directly the number of bits in the first indicating field in the DCI, and for example, indicate the number of bits in the first indicating field as 8 in 3-bit higher-layer signaling.

In a particular implementation, the eNB can further determine the number of bits in the first indicating field according to the number of aggregated component carriers (the Component Carrier (CC) here can also referred to be as a serving cell), a transmission mode, and whether spatial merging is to be made. Here the maximum one of the A numbers of bits can be $\lceil \log_2 N \times M \times C \rceil$, where N is the number of configured component carriers, or N=32 (configured directly as 32 despite the number of configured component carriers); M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or the maximum one of the A numbers of bits can be $$\left\lceil \log_2 M \times \sum_{i=1}^{N} C_i \right\rceil,$$

where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1. Here there may be different Ci of different component carriers, and for example, Ci of one component carrier equals to 2, and Ci of another component carrier equals to 1.

In the step above, the configuration information in the higher-layer signaling includes K-bit higher-layer signaling indicating the number P of bits in the first indicating field; where 1) K is 3, and P is one of the positive integers 1 to 8; or 2) K is 3, and P is one of the positive integers 2 to 8; or 3) K is 3, and P is one of the positive integers 2 to 7; or 4) K is 2, and P is one of positive integers x1, x2, x3, and x4, where x1, x2, x3, and x4 are any four of the positive integers 1 to 8; or 5) K is 1, and P is one of positive integers x1' and x2', where x1' and x2' are any two of the positive integers 1 to 8.

Furthermore when K is 2 in 4), the values of x1, x2, x3, and x4 can be but will not be limited to the following several instances.

x1, x2, x3, and x4 are 2, 3, 4, and 5 respectively, and this instance is applicable to the FDD mode and C=1; or x1, x2, x3, and x4 are 3, 4, 5, and 6 respectively, and this instance is applicable to the FDD mode and C=2; or any two of x1, x2, x3, and x4 are 2 and 7 respectively, and the other two are any two of 3, 4, 5, and 6, and this instance is applicable to the TDD mode and C=1; or any two of x1, x2, x3, and x4 are 2 and 8 respectively, and the other two are any two of 3, 4, 5, 6, and 7, and this instance is applicable to the TDD mode and C=2.

When K=1 in 5), the values of x1' and x2' can be but will not be limited to the following several instances.

x1' and x2' are 2 and 5 respectively, and this instance is applicable to the FDD mode and C=1; or x1' and x2' are 2 and 6 respectively, and this instance is applicable to the FDD mode and C=2; or x1' and x2' are 2 and 7 respectively, and this instance is applicable to the TDD mode and C=1; or x1' and x2' are 2 and 8 respectively, and this instance is applicable to the TDD mode and C=2.

The idea of the first embodiment will be described below in several particular examples.

First Example

Figure 5A:
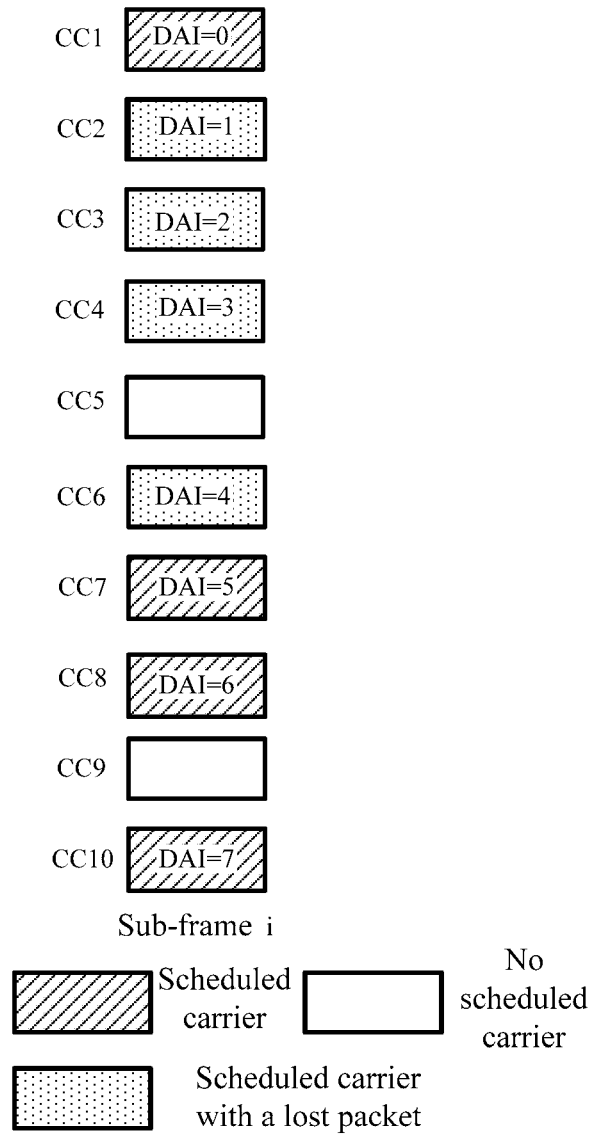
FIG. 5A is a first schematic diagram of a first indicating field.
Figure 5B:
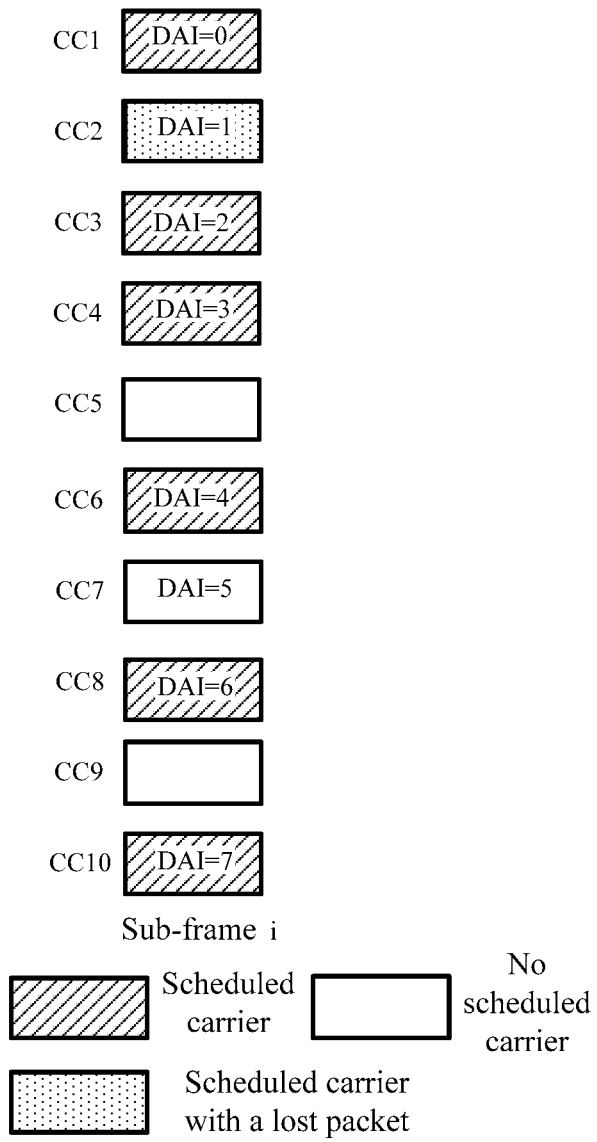
FIG. 5B is a second schematic diagram of the first indicating field.
Figure 10:
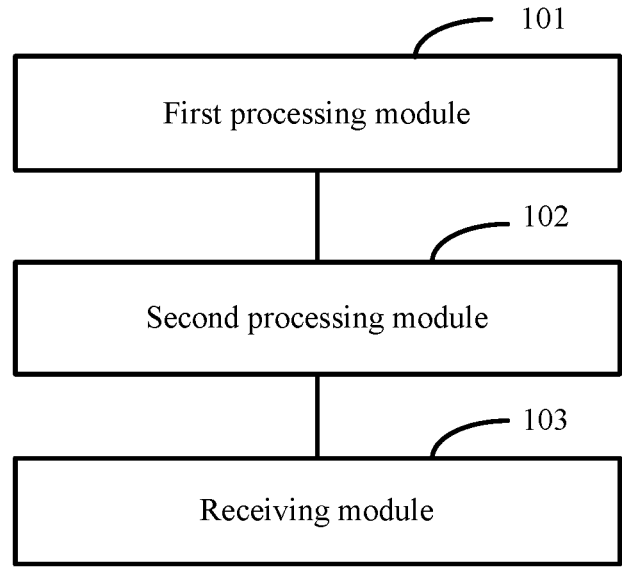
FIG. 10 is a schematic structural diagram of an apparatus for transmitting DCI according to a third embodiment of the invention.

For FDD carrier aggregation, in the case that the number of aggregated carriers, a transmission mode of each carrier, and whether spatial merging is made are not considered, when there is a required support of transmitting dynamically a sequence of ACK/NACK feedback information at a lower error probability, the eNB indicates the first indicating field in the DCI as 5 (for example, when C of each carrier is 1) or 6 (for example, when C of each carrier is 2) bits via higher-layer signaling, and at this time, the number of carriers over which there is really scheduled transmission is counted in the first indicating field in an ascending order of carrier numbers among all of the aggregated carriers. As illustrated in FIG. 5A, 10 carriers are aggregated, for example (the DAI as illustrated is the first indicating field), and even if there are x consecutively counted packets lost, where when there are 5 bits in the first indicating field, x is any one of the positive integers less than $2^5$, and when there are 6 bits in the first indicating field, x is any one of the positive integers less than $2^6$, then a loss of intermediate packets, and the number of lost packets may be determined according to the count of the DAI over a component carrier over which data are subsequently received, so the eNB and the UE can have consistent understanding of the ACK/NACK fed back by the UE. Alternatively when it is determined that there is no loss or an infrequent loss of a large number of consecutively counted packets, the eNB indicates the first indicating field in the DCI as 2 bits via higher-layer signaling, and at this time, the carriers are counted in the first indicating field in the same way as described above except that the count is cycled after it overruns 4; and as illustrated in FIG. 5B, at this time, if there is a loss of no more than four consecutive packets, then a loss of intermediate packets, and the number of lost packets may be determined according to the count of the DAI over a component carrier over which data are subsequently received, so the eNB and the UE can have consistent understanding of the ACK/NACK fed back by the UE.

Second Example

Figure 6A:
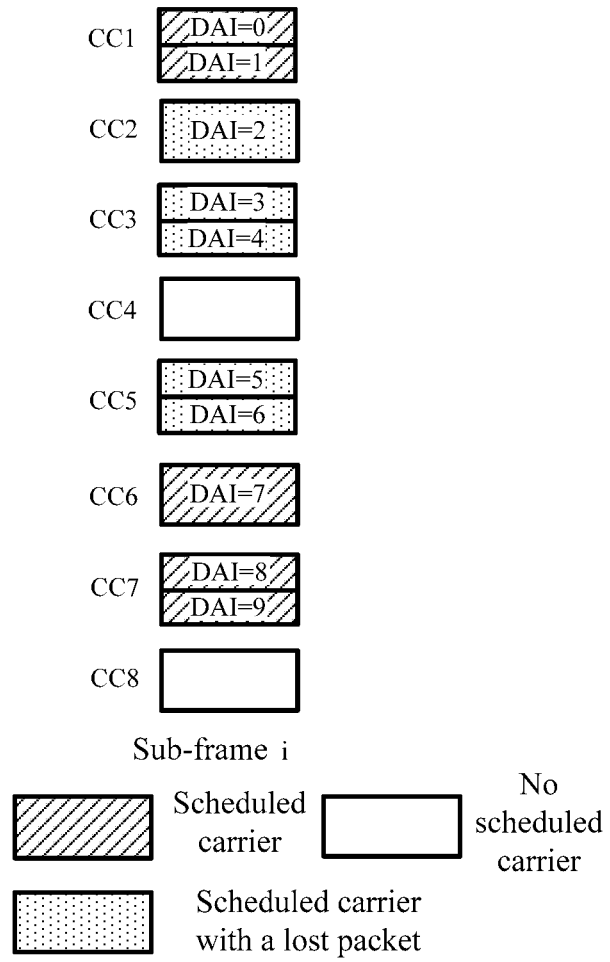
FIG. 6A is a third schematic diagram of the first indicating field.
Figure 6B:
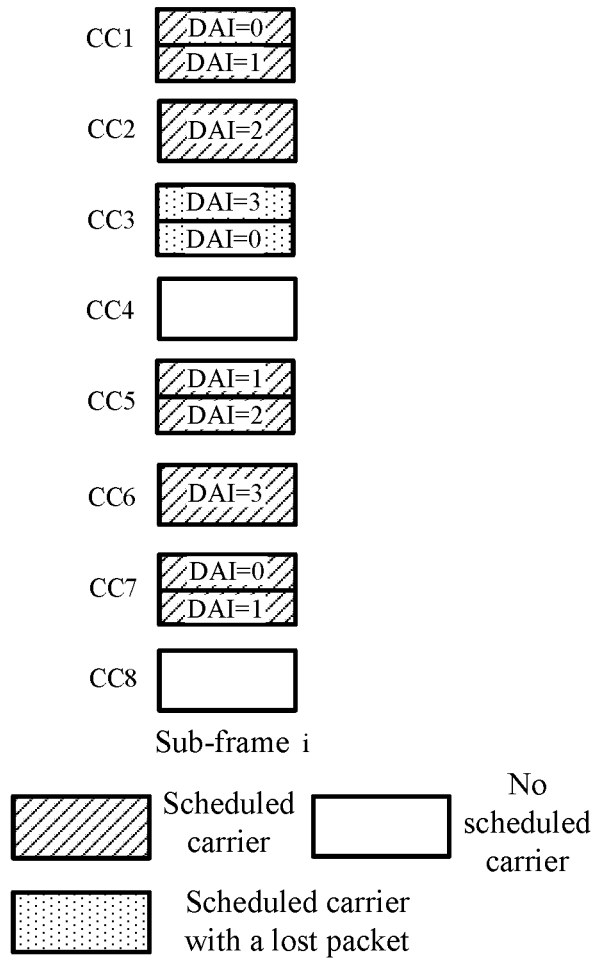
FIG. 6B is a fourth schematic diagram of the first indicating field.

For FDD carrier aggregation, the number of bits in the first indicating field in the DCI can be determined according to the number of aggregated carriers, whether there is multi-TB transmission, and whether spatial merging is made. For example, when 8 component carriers are aggregated, if all of the component carriers 1, 3, 5, and 7 operate with 2-TB transmission but without spatial merging, i.e., Ci=2, and all of the component carriers 2, 4, 6, and 8 operate with 1-TB transmission, i.e., Ci=1, and also if M=1 so that $$\left\lceil \log_2 M \times \sum_{i=1}^{N} C_i \right\rceil = \lceil \log_2 N \times M \times C \rceil = 4,$$

then when there is a required support of transmitting dynamically a sequence of ACK/NACK feedback information at a lower error probability, the eNB will indicate the first indicating field in the DCI as 4 bits via higher-layer signaling, and at this time, the number of TBs (including a PDCCH/EPDCCH indicating a downlink SPS resource release, which is regarded as a TB) in which there is really scheduled transmission is counted in the first indicating field in an ascending order of carrier numbers among all of the aggregated carriers. As illustrated in FIG. 6A, even if there are x consecutive packets lost, where x is any one of the positive integers less than $2^4$, then a loss of intermediate packets, and the number of lost packets may be determined according to the count of the DAI over a component carrier over which data are subsequently received, so the eNB and the UE can have consistent understanding of the ACK/NACK. Alternatively when it is determined that there is no loss or an infrequent loss of a large number of consecutively counted packets, the first indicating field in the DCI is indicated as 2 bits via higher-layer signaling, and at this time, the carriers are counted in the first indicating field in the same way as described above except that the count is cycled after it overruns 4; and as illustrated in FIG. 6B, at this time, if there is a loss of no more than four consecutive packets, then a loss of intermediate packets, and the number of lost packets may be determined according to the count of the DAI over a component carrier over which data are subsequently received, so the eNB and the UE can have consistent understanding of the ACK/NACK fed back by the UE. In another example, if each component carrier operates with 1-TB transmission, i.e., C=1, so that $$\left\lceil \log_2 M \times \sum_{i=1}^{N} C_i \right\rceil = \lceil \log_2 N \times M \times C \rceil = 3,$$

then if there is a required support of transmitting dynamically a sequence of ACK/NACK feedback information at a lower error probability, then the eNB will indicate the first indicating field in the DCI as 3 bits via higher-layer signaling; otherwise, the eNB will indicate the first indicating field in the DCI as 2 bits via higher-layer signaling.

Third Example

Figure 7A:
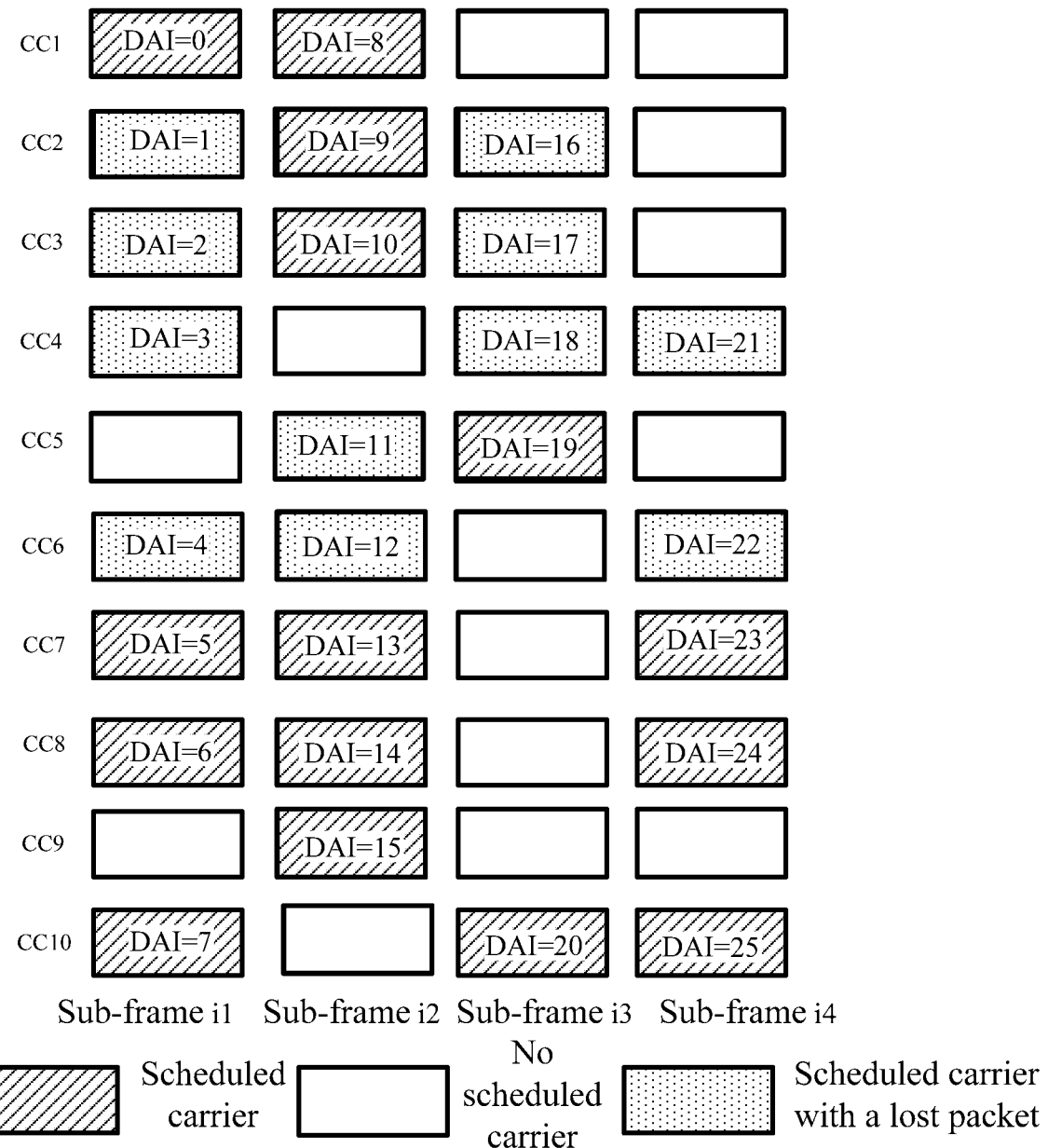
FIG. 7A is a fifth schematic diagram of the first indicating field.
Figure 7B:
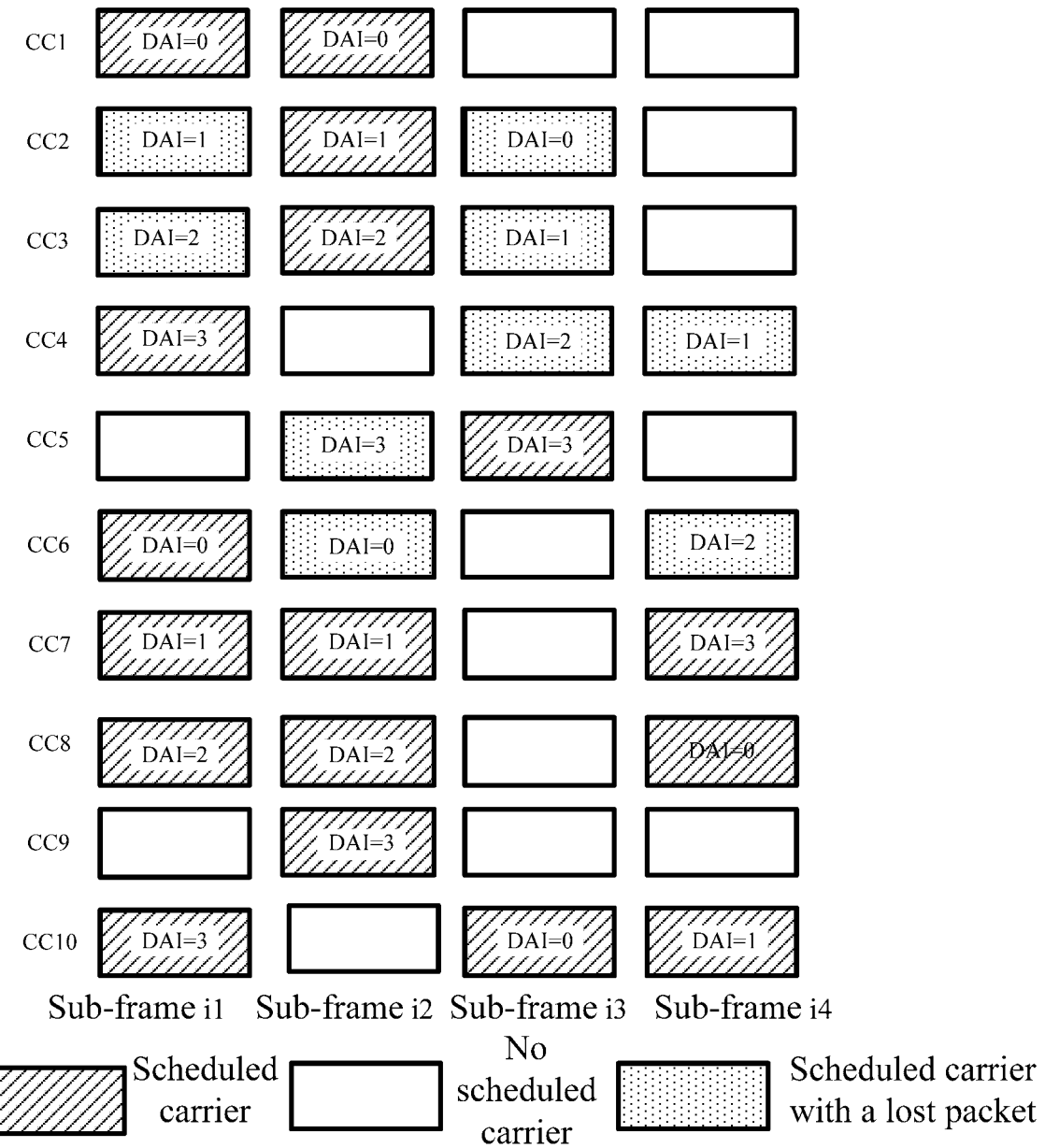
FIG. 7B is a sixth schematic diagram of the first indicating field.

For TDD carrier aggregation, in the case that the number of aggregated carriers, a transmission mode of each carrier, and whether spatial merging is made are not considered, when there is a required support of transmitting dynamically a sequence of ACK/NACK feedback information at a lower error probability, the eNB indicates the first indicating field in the DCI as 7 (for example, when C of each carrier is 1) or 8 (for example, when C of each carrier is 2) bits via higher-layer signaling, and at this time, the number of data packets over which there is really scheduled transmission is counted in the first indicating field in a firstly frequency and then time order, and in an ascending order of carrier numbers in a sub-frame among M sub-frames and all of the aggregated carriers. As illustrated in FIG. 7A, 10 carriers are aggregated, for example (the DAI as illustrated is the first indicating field), and even if there are x consecutive packets lost, where when there are 7 bits in the first indicating field, x is any one of the positive integers less than $2^7$, and when there are 8 bits in the first indicating field, x is any one of the positive integers less than $2^8$, then a loss of intermediate packets, and the number of lost packets may be determined according to the count of the DAI over a sub-frame/component carrier over which data are subsequently received, so the eNB and the UE can have consistent understanding of the ACK/NACK fed back by the UE. Alternatively when it is determined that there is no loss or an infrequent loss of a large number of consecutively counted packets, the eNB indicates the first indicating field in the DCI as 2 bits via higher-layer signaling, and at this time, the carriers are counted in the first indicating field in the same way as described above except that the count is cycled after it overruns 4; and as illustrated in FIG. 7B, at this time, if there is a loss of no more than four consecutive packets, then a loss of intermediate packets, and the number of lost packets may be determined according to the count of the DAI over a component carrier over which data are subsequently received, so the eNB and the UE can have consistent understanding of the ACK/NACK fed back by the UE.

Fourth Example

Figure 8A:
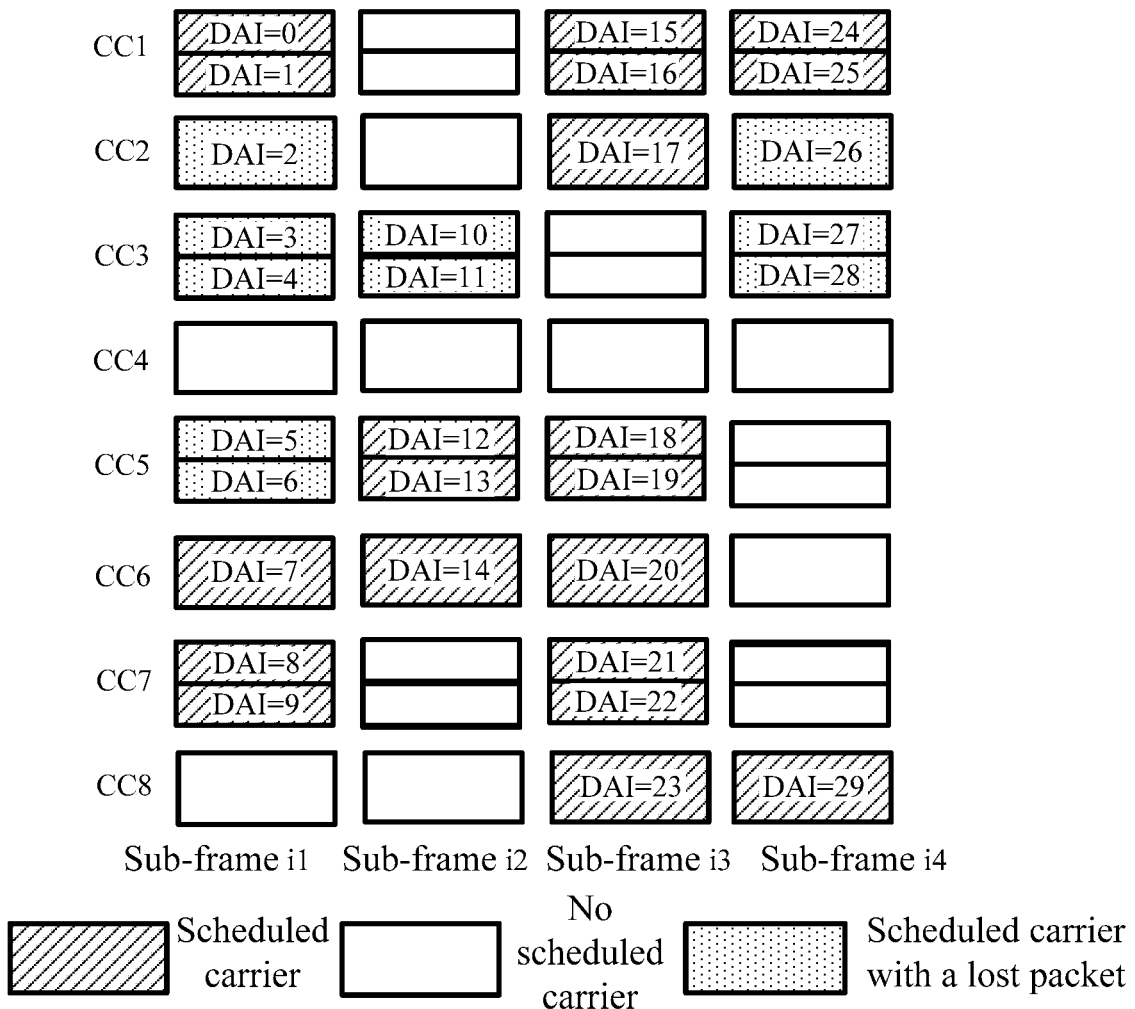
FIG. 8A is a seventh schematic diagram of the first indicating field.
Figure 8B:
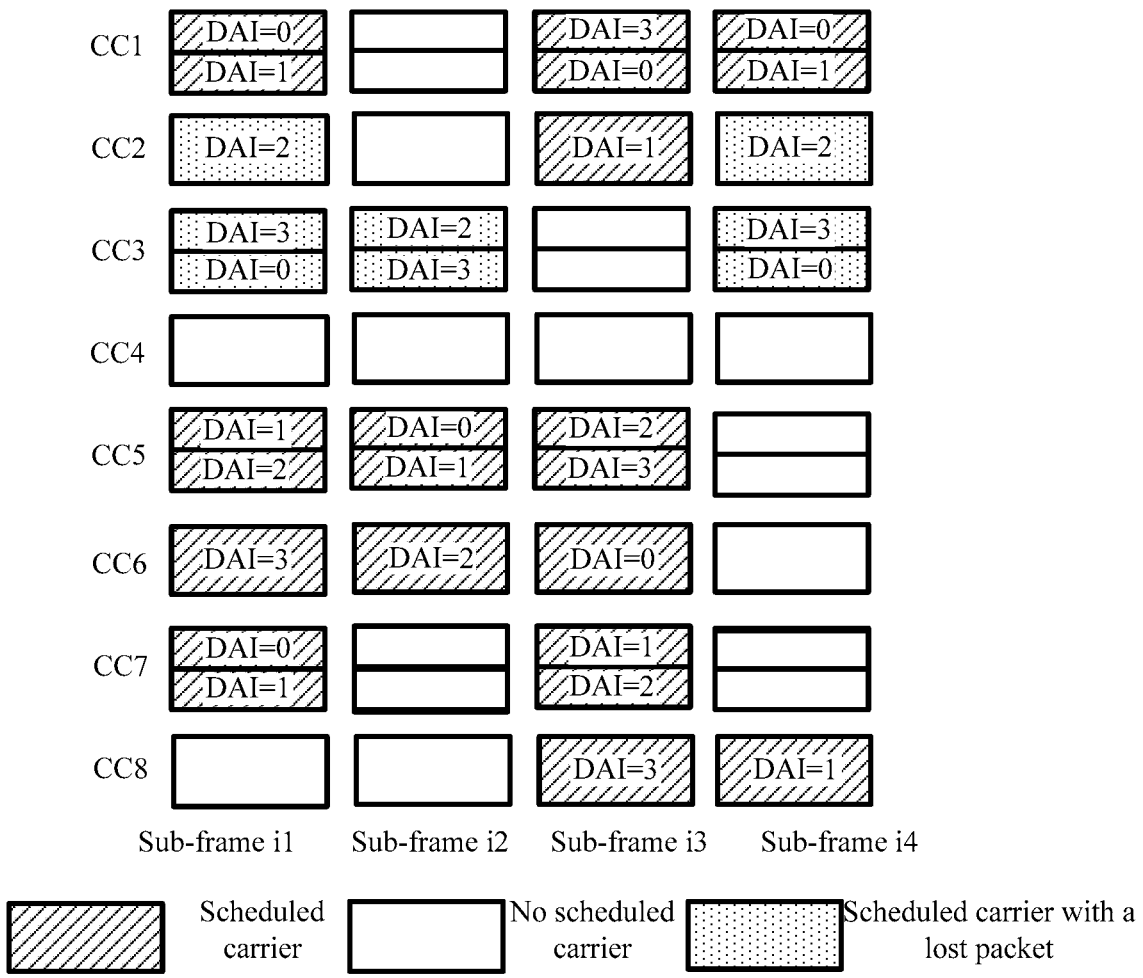
FIG. 8B is an eighth schematic diagram of the first indicating field.

For TDD carrier aggregation, the number of bits in the first indicating field in the DCI can be determined according to the number of aggregated carriers, whether there is multi-TB transmission, and whether spatial merging is made. For example, when 8 component carriers are aggregated, if all of the component carriers 1, 3, 5, and 7 operate with 2-TB transmission but without spatial merging, i.e., C=2, and if M=4 so that $$\left\lceil \log_2 M \times \sum_{i=1}^{N} C_i \right\rceil = \lceil \log_2 N \times M \times C \rceil = 6,$$

then when there is a required support of transmitting dynamically a sequence of ACK/NACK feedback information at a lower error probability, the eNB will indicate the first indicating field in the DCI as 6 bits via higher-layer signaling, and at this time, the number of TBs (including a PDCCH/EPDCCH indicating a downlink SPS resource release, which is regarded as a TB) in which there is really scheduled transmission is counted in the first indicating field in a firstly frequency and then time order, and in an ascending order of carrier numbers in a sub-frame among M sub-frames and all of the aggregated carriers. As illustrated in FIG. 8A, even if there are x consecutive packets lost, where x is any one of the positive integers less than $2^6$, then a loss of intermediate packets, and the number of lost packets may be determined according to the count of the DAI over a sub-carrier/component carrier over which data are subsequently received, so the eNB and the UE can have consistent understanding of the ACK/NACK. Alternatively when it is determined that there is no loss or an infrequent loss of a large number of consecutively counted packets, the first indicating field in the DCI is indicated as 2 bits via higher-layer signaling, and at this time, the carriers are counted in the first indicating field in the same way as described above except that the count is cycled after it overruns 4; and as illustrated in FIG. 8B, at this time, if there is a loss of no more than four consecutive TBs, then a loss of intermediate packets, and the number of lost packets may be determined according to the count of the DAI over a sub-carrier/carrier over which data are subsequently received, so the eNB and the UE can have consistent understanding of the ACK/NACK fed back by the UE. In another example, if each component carrier operates with 1-TB transmission, i.e., C=1, so that $$\left\lceil \log_2 M \times \sum_{i=1}^{N} C_i \right\rceil = \lceil \log_2 N \times M \times C \rceil = 5,$$

then if there is a required support of transmitting dynamically a sequence of ACK/NACK feedback information at a lower error probability, then the eNB will indicate the first indicating field in the DCI as 5 bits via higher-layer signaling; otherwise, the eNB will indicate the first indicating field in the DCI as 2 bits via higher-layer signaling.

Fifth Example

For FDD and TDD carrier aggregation, where FDD carriers are a carrier group 1, and TDD carriers are a carrier group 2, in the case that the number of aggregated carriers, a transmission mode of each carrier, and whether spatial merging is made are not considered, for the carrier group 1, when there is a required support of transmitting dynamically a sequence of ACK/NACK feedback information at a lower error probability, the eNB indicates the first indicating field in the DCI as 5 or 6 bits via higher-layer signaling, particularly in a similar operating process to the first example. Alternatively when it is determined that there is no loss or an infrequent loss of a large number of consecutively counted packets, the eNB indicates the first indicating field in the DCI as 2 bits via higher-layer signaling, and at this time, the count is cycled after it overruns 4, particularly in a similar operating process to the first example. For the carrier group 2, when there is a required support of transmitting dynamically a sequence of ACK/NACK feedback information at a lower error probability, the eNB indicates the first indicating field in the DCI as 7 or 8 bits via higher-layer signaling, particularly in a similar operating process to the third example. Alternatively when it is determined that there is no loss or an infrequent loss of a large number of consecutively counted packets, the eNB indicates the first indicating field in the DCI as 2 bits via higher-layer signaling, and at this time, the count is cycled after it overruns 4, particularly in a similar operating process to the third example.

Sixth Example

For FDD and TDD carrier aggregation, where FDD carriers are a carrier group 1, and TDD carriers are a carrier group 2, the number of bits in the first indicating field in the DCI can be determined according to the number of aggregated carriers, whether there is multi-TB transmission, and whether spatial merging is made. For the carrier group 1, there is a similar operating process to the second example. For the carrier group 1, there is a similar operating process to the fourth example.

Second Embodiment

Figure 9:
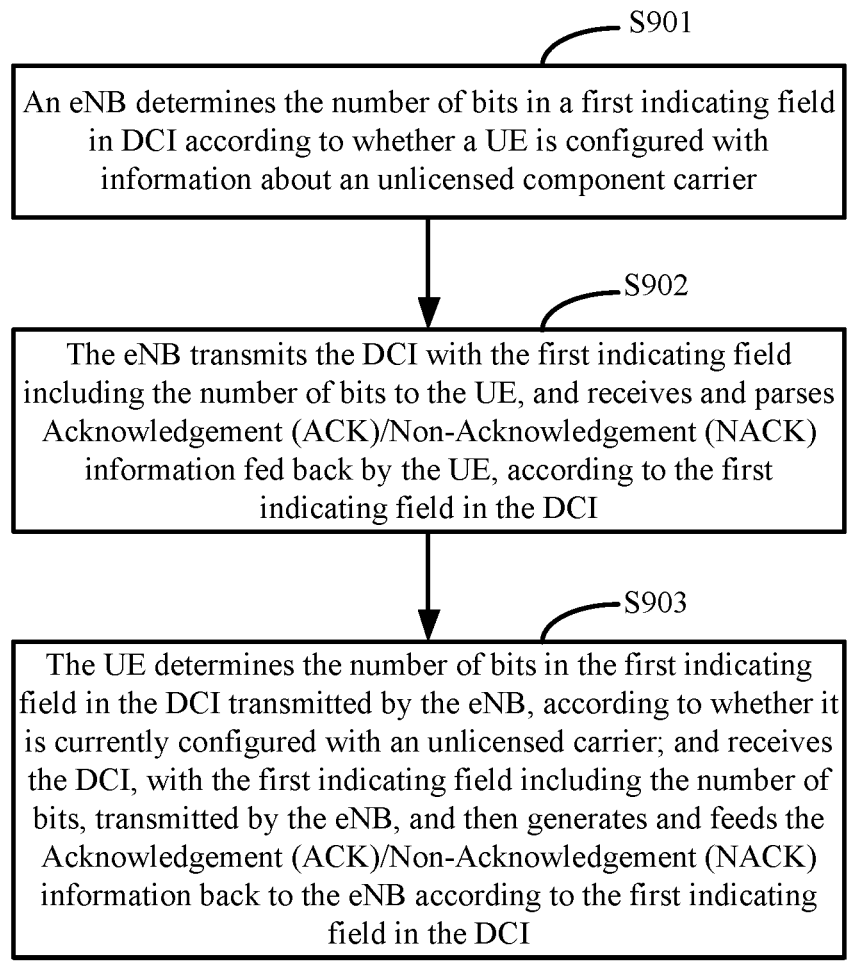
FIG. 9 is a flow chart of a method for transmitting DCI according to a second embodiment of the invention.

FIG. 9 illustrates a flow chart of a method for transmitting DCI according to a second embodiment of the invention, where the method includes the following steps.

In the step S901, an eNB determines the number of bits in a first indicating field in DCI according to whether a UE is configured with information about an unlicensed component carrier, where the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame.

The PDCCH/EPDCCH means that the downlink control channel may be a non-enhanced PDCCH or an Enhanced Physical Downlink Control Channel (EPDCCH).

In the step S902, the eNB transmits the DCI with the first indicating field including the number of bits to the UE, and receives and parses Acknowledgement (ACK)/Non-Acknowledgement (NACK) information fed back by the UE, according to the first indicating field in the DCI.

In the step S903, the UE determines the number of bits in the first indicating field in the DCI transmitted by the eNB, according to whether it is currently configured with an unlicensed carrier; and receives the DCI, with the first indicating field including the number of bits, transmitted by the eNB, and then generates and feeds the Acknowledgement (ACK)/Non-Acknowledgement (NACK) information back to the eNB according to the first indicating field in the DCI.

In the step above, the eNB can determine the number of bits in the first indicating field in the DCI according to whether the UE is configured with information about an unlicensed component carrier in the following several instances without any limitation thereto.

1) When at least one unlicensed carrier is configured (that is, there is an LAA SCC, where the SCC stands for a Secondary Component Carrier), the number of bits in the first indicating field is determined as 5; otherwise, the number of bits in the first indicating field is determined as 2. This instance is applicable to the FDD mode and C=1.

2) When at least one unlicensed carrier is configured, the number of bits in the first indicating field is determined as 6; otherwise, the number of bits in the first indicating field is determined as 2. This instance is applicable to the FDD mode and C=1.

3) When at least one unlicensed carrier is configured, the number of bits in the first indicating field is determined as 7; otherwise, the number of bits in the first indicating field is determined as 2. This instance is applicable to the TDD mode and C=1.

4) When at least one unlicensed carrier is configured, the number of bits in the first indicating field is determined as 8; otherwise, the number of bits in the first indicating field is determined as 2. This instance is applicable to the TDD mode and C=2.

5) When at least one unlicensed carrier is configured, the number of bits in the first indicating field is determined as $\lceil \log_2 N \times M \times C \rceil$; otherwise, the number of bits in the first indicating field is determined as 2, where N is the number of configured component carriers, or N=32; M is the number of sub-frames for which Acknowledgement (ACK)/Non-Acknowledgement (NACK) information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or When at least one unlicensed carrier is configured, the number of bits in the first indicating field is determined as $$\left\lceil \log_2 M \times \sum_{i=1}^{N} C_i \right\rceil;$$

otherwise, the number of bits in the first indicating field is determined as 2, where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

The idea of the second embodiment will be described below in several particular examples.

First Example

For FDD carrier aggregation, in the case that the number of aggregated carriers, a transmission mode of each carrier, and whether spatial merging is made are not considered, if it is determined that there is at least one unlicensed carrier (i.e., an LAA SCC), then the first indicating field in the DCI will be determined as 5 or 6 bits, and at this time, the number of carriers over which there is really scheduled transmission will be counted in the first indicating field in an ascending order of carrier numbers among all of the aggregated carriers, and even if there are x consecutive packets lost, where when there are 5 bits in the first indicating field, x is any one of the positive integers less than $2^5$, and when there are 6 bits in the first indicating field, x is any one of the positive integers less than $2^6$, then a loss of intermediate packets, and the number of lost packets may be determined according to the count of the DAI over a component carrier over which data are subsequently received, so the eNB and the UE can have consistent understanding of the ACK/NACK fed back by the UE; otherwise, the first indicating field in the DCI will be determined as 2 bits, and at this time, the carriers will be counted in the first indicating field in the same way as described above except that the count is cycled after it overruns 4, and if there is a loss of no more than four consecutive packets, then a loss of intermediate packets, and the number of lost packets may be determined according to the count of the DAI over a component carrier over which data are subsequently received, so the eNB and the UE can have consistent understanding of the ACK/NACK fed back by the UE. Reference can be made to FIG. 5A and FIG. 5B for particular operating processes thereof.

Second Example

For FDD carrier aggregation, the number of bits in the first indicating field in the DCI can be determined according to the number of aggregated carriers, whether there is multi-TB transmission, and whether spatial merging is made. For example, when 8 component carriers are aggregated, if all of the component carriers 1, 3, 5, and 7 operate with 2-TB transmission but without spatial merging, i.e., Ci=2, and all of the component carriers 2, 4, 6, and 8 operate with 1-TB transmission, i.e., Ci=1, and also if M=1 so that $$\left\lceil \log_2 M \times \sum_{i=1}^{N} C_i \right\rceil = \lceil \log_2 N \times M \times C \rceil = 4,$$

then if it is determined that the UE is configured with at least one unlicensed carrier (i.e., an LAA SCC), then the first indicating field in the DCI will be determined as 4 bits, and at this time, the number of carriers which there is really scheduled transmission is counted in the first indicating field in an ascending order of carrier numbers among all of the aggregated carriers. Even if there are x consecutive packets lost, where x is any one of the positive integers less than $2^4$, then a loss of intermediate packets, and the number of lost packets may be determined according to the count of the DAI over a component carrier over which data are subsequently received, so the eNB and the UE can have consistent understanding of the ACK/NACK; otherwise, the first indicating field in the DCI will be determined as 2 bits, and at this time, the carriers will be counted in the first indicating field in the same way as described above except that the count is cycled after it overruns 4. If there is a loss of no more than four consecutive packets, then a loss of intermediate packets, and the number of lost packets may be determined according to the count of the DAI over a component carrier over which data are subsequently received, so the eNB and the UE can have consistent understanding of the ACK/NACK fed back by the UE. Reference can be made to FIG. 6A and FIG. 6B for particular operating processes thereof. In another example, if each component carrier operates with 1-TB transmission, i.e., C=1, so that $$\left\lceil \log_2 M \times \sum_{i=1}^{N} C_i \right\rceil = \lceil \log_2 N \times M \times C \rceil = 3,$$

then if it is determined that there is at least one unlicensed carrier (i.e., an LAA SCC), then the first indicating field in the DCI will be determined as 3 bits; otherwise, the first indicating field in the DCI will be determined as 2 bits.

Third Example

For TDD carrier aggregation, in the case that the number of aggregated carriers, a transmission mode of each carrier, and whether spatial merging is made are not considered, if it is determined that there is at least one unlicensed carrier (i.e., an LAA SCC), then the first indicating field in the DCI will be determined as 7 or 8 bits, and at this time, the number of data packets over which there is really scheduled transmission will be counted in the first indicating field in a firstly frequency and then time order, and in an ascending order of carrier numbers in a sub-frame among M sub-frames and all of the aggregated carriers, and even if there are x consecutive packets lost, where when there are 7 bits in the first indicating field, x is any one of the positive integers less than $2^7$, and when there are 8 bits in the first indicating field, x is any one of the positive integers less than $2^8$, then a loss of intermediate packets, and the number of lost packets may be determined according to the count of the DAI over a component carrier over which data are subsequently received, so the eNB and the UE can have consistent understanding of the ACK/NACK fed back by the UE; otherwise, the first indicating field in the DCI will be determined as 2 bits, and at this time, the carriers will be counted in the first indicating field in the same way as described above except that the count is cycled after it overruns 4, and if there is a loss of no more than four consecutive packets, then a loss of intermediate packets, and the number of lost packets may be determined according to the count of the DAI over a sub-frame/carrier over which data are subsequently received, so the eNB and the UE can have consistent understanding of the ACK/NACK fed back by the UE. Reference can be made to FIG. 7A and FIG. 7B for particular operating processes thereof.

Fourth Example

For TDD carrier aggregation, the number of bits in the first indicating field in the DCI can be determined according to the number of aggregated carriers, whether there is multi-TB transmission, and whether spatial merging is made. For example, when 8 component carriers are aggregated, if all of the component carriers 1, 3, 5, and 7 operate with 2-TB transmission but without spatial merging, i.e., Ci=2, and all of the component carriers 2, 4, 6, and 8 operate with 1-TB transmission, i.e., Ci=1, and also if M=4 so that $$\left\lceil \log_2 M \times \sum_{i=1}^{N} C_i \right\rceil = \lceil \log_2 N \times M \times C \rceil = 6,$$

then if it is determined that the UE is configured with at least one unlicensed carrier (i.e., an LAA SCC), then the first indicating field in the DCI will be determined as 6 bits, and at this time, the number of data packets over which there is really scheduled transmission will be counted in the first indicating field in a firstly frequency and then time order, and in an ascending order of carrier numbers in a sub-frame among M sub-frames and all of the aggregated carriers, and even if there are x consecutive packets lost, where x is any one of the positive integers less than $2^6$, then a loss of intermediate packets, and the number of lost packets may be determined according to the count of the DAI over a sub/frame/component carrier over which data are subsequently received, so the eNB and the UE can have consistent understanding of the ACK/NACK fed back by the UE; otherwise, the first indicating field in the DCI will be determined as 2 bits, and at this time, the carriers will be counted in the first indicating field in the same way as described above except that the count is cycled after it overruns 4, and if there is a loss of no more than four consecutive packets, then a loss of intermediate packets, and the number of lost packets may be determined according to the count of the DAI over a sub-frame/carrier over which data are subsequently received, so the eNB and the UE can have consistent understanding of the ACK/NACK fed back by the UE. Reference can be made to FIG. 8A and FIG. 8B for particular operating processes thereof. In another example, if each component carrier operates with 1-TB transmission, i.e., C=1, so that $$\left\lceil \log_2 M \times \sum_{i=1}^{N} C_i \right\rceil = \lceil \log_2 N \times M \times C \rceil = 3,$$

then if it is determined that there is at least one unlicensed carrier (i.e., an LAA SCC), then the first indicating field in the DCI will be determined as 3 bits; otherwise, the first indicating field in the DCI will be determined as 2 bits.

Fifth Example

For FDD and TDD carrier aggregation, where FDD carriers are a carrier group 1, and TDD carriers are a carrier group 2, in the case that the number of aggregated carriers, a transmission mode of each carrier, and whether spatial merging is made are not considered, for the carrier group 1, a particular operating process is similar to the first example. For the carrier group 2, a particular operating process is similar to the third example.

Sixth Example

For FDD and TDD carrier aggregation, where FDD carriers are a carrier group 1, and TDD carriers are a carrier group 2, the number of bits in the first indicating field in the DCI can be determined according to the number of aggregated carriers in each carrier group, whether there is multi-TB transmission, and whether spatial merging is made. For example, for the carrier group 1, a particular operating process is similar to the second example; and for the carrier group 2, a particular operating process is similar to the fourth Example Furthermore when a plurality of carrier groups are configured, the number of bits in the first indicating field in the DCI of each carrier group is determined respectively as in the first embodiment or the second embodiment.

That is, when the number of bits in the first indicating field in the DCI is configured via higher-layer signaling, configuration information, in the higher-layer signaling, indicating the number of bits in the first indicating field in the DCI in each carrier group is transmitted separately for each carrier group; and the numbers of bits in the higher-layer signaling indicating the numbers of bits in the first indicating fields in the DCI in different carrier groups may or may not be the same, and for example, the higher-layer signaling of one carrier group is 3 bits, and the higher-layer signaling of another carrier group is 2 bits, so optional sets of the numbers of bits in the first indicating fields, indicated in the higher-layer signaling of the different carrier groups also may or may not be the same, particularly dependent upon real configurations and demands in the carrier groups. When the number of bits in the first indicating field in the DCI is determined according to whether there is an unlicensed carrier configured, for each carrier group, the number of bits in the first indicating field in the DCI in the carrier group is determined respectively according to whether there is an unlicensed carrier in the carrier group, where this may or may not be determined for different carrier groups in the same way, particularly dependent upon real configurations and demands in the carrier groups, and for example, the number of bits in the first indicating field is determined for one carrier group in the same way as described in 1) above, and the number of bits in the first indicating field is determined for another carrier group in the same way as described in 2) or 3) or 4) above; and preferably the carriers are grouped by grouping carriers in different duplex modes together, and grouping carriers with the same transmission mode and/or spatial merging (i.e., carriers with the same value of C) together.

As described above, the numbers of bits in the first indicating fields in the DCI in the different carrier groups may or may not be the same, and for example, the number of bits in the first indicating fields in the DCI in one carrier group is 5 bits, and the number of bits in the first indicating fields in the DCI in another carrier group is 7 bits, where when the number of bits in the first indicating field is determined as described above, the number N of configured component carriers is the number of component carriers in a carrier group, M is the number of sub-frames, in a carrier group, for which Acknowledgement (ACK) or Non-Acknowledgement (NACK) information is to be fed back in the same uplink sub-frame, and in a carrier group, if there is multi-TB transmission, and ACK or NACK of multiple TBs in the same sub-frame is not to be merged spatially, then C=2; otherwise, C=1.

Furthermore when the method in the first embodiment and the second embodiment is applied to the Frequency Division Duplex (FDD) mode, M=1, or when a TDD carrier is a primary carrier, and FDD carriers are secondary carriers, M corresponding to the FDD secondary carriers are determined according to a TDD reference uplink-downlink configuration; when the method is applied to the Time Division Duplex (TDD) mode, the value of M is determined according to a TDD uplink-downlink configuration indicated in an SIB, or a TDD reference uplink-downlink configuration; and when the values of M are different for different uplink sub-frames and/or different component carriers, the maximum one of the respective values of M is taken.

In the embodiments of the invention, the number of bits in the first indicating field in the DCI can be determined as configured via the higher-layer signaling, or according to whether there is an unlicensed component carrier configured, so that the number of bits in the first indicating field in the DCI can be reasonably set particularly as needed, so that the UE and the eNB can have consistent understanding of a dynamically determined sequence of ACK/NACK feedback information in different scenarios.

Based upon the same inventive idea, an embodiment of the invention further provides an apparatus for transmitting DCI, corresponding to the method for transmitting DCI, and since the apparatus addresses the problem under a similar principle to the method for transmitting DCI according to the embodiment of the invention, reference can be made to the implementation of the method for an implementation of the apparatus, and a repeated description thereof will be omitted here.

Third Embodiment

FIG. 10 illustrates a schematic structural diagram of an apparatus for transmitting DCI according to a third embodiment of the invention, where the apparatus includes followings.

A first processing module 101 is configured to determine information indicating the number of bits in a first indicating field in DCI, where the information includes configuration information in higher-layer signaling, or information about whether there is an unlicensed component carrier configured; and the first indicating field indicates the sum of the total number of Physical Downlink Control Channels (PDCCHs)/Enhanced Physical Downlink Control Channels (EPDCCHs), with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame.

A second processing module 102 is configured to determine the number of bits in the first indicating field in the DCI according to the configuration information in the higher-layer signaling, or the information about whether there is an unlicensed component carrier configured.

Optionally the apparatus further includes followings.

A receiving module 103 is configured to receive the DCI, with the first indicating field including the number of bits, transmitted by the eNB, and to generate and feed the Acknowledgement (ACK)/Non-Acknowledgement (NACK) information back to the eNB according to the first indicating field in the DCI.

Optionally the configuration information in the higher-layer signaling includes $\lceil \log_2 A \rceil$ bits of higher-layer signaling indicating the number of bits in the first indicating field, where the number of bits in the first indicating field is one of A numbers of bits, and A is a positive integer.

Optionally the maximum one of the A numbers of bits is $\lceil \log_2 N \times M \times C \rceil$, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or the maximum one of the A numbers of bits is $$\left\lceil \log_2 M \times \sum_{i=1}^{N} C_i \right\rceil,$$

where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the configuration information in the higher-layer signaling includes: K-bit higher-layer signaling indicating the number P of bits in the first indicating field; where K is 3, and P is one of the positive integers 1 to 8; or K is 3, and P is one of the positive integers 2 to 8; or K is 3, and P is one of the positive integers 2 to 7; or K is 2, and P is one of positive integers x1, x2, x3, and x4, where x1, x2, x3, and x4 are any four of the positive integers 1 to 8; or K is 1, and P is one of positive integers x1' and x2', where x1' and x2' are any two of the positive integers 1 to 8.

Optionally the second processing module 102 is configured:
when there is at least one unlicensed carrier configured, to determine the number of bits in the first indicating field as 5; otherwise, to determine the number of bits in the first indicating field as 2; or
when there is at least one unlicensed carrier configured, to determine the number of bits in the first indicating field as 6; otherwise, to determine the number of bits in the first indicating field as 2; or
when there is at least one unlicensed carrier configured, to determine the number of bits in the first indicating field as 7; otherwise, to determine the number of bits in the first indicating field as 2; or
when there is at least one unlicensed carrier configured, to determine the number of bits in the first indicating field as 8; otherwise, to determine the number of bits in the first indicating field as 2; or
when there is at least one unlicensed carrier configured, to determine the number of bits in the first indicating field as $\lceil \log_2 N \times M \times C \rceil$; otherwise, to determine the number of bits in the first indicating field as 2, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or
when there is at least one unlicensed carrier configured, to determine the number of bits in the first indicating field as $$\left\lceil \log_2 M \times \sum_{i=1}^{N} C_i \right\rceil;$$

otherwise, to determine the number of bits in the first indicating field as 2, where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the second processing module 102 is further configured when a plurality of carrier groups are configured, to determine the number of bits in the first indicating field in the DCI of each carrier group respectively as in one of the ways as described above.

Optionally when the values of M are different for different uplink sub-frames and/or different component carriers, the maximum one of the respective values of M is taken.

Optionally the higher-layer signaling is Radio Resource Control (RRC) signaling or Media Access Control (MAC) signaling.

Fourth Embodiment

Figure 11:
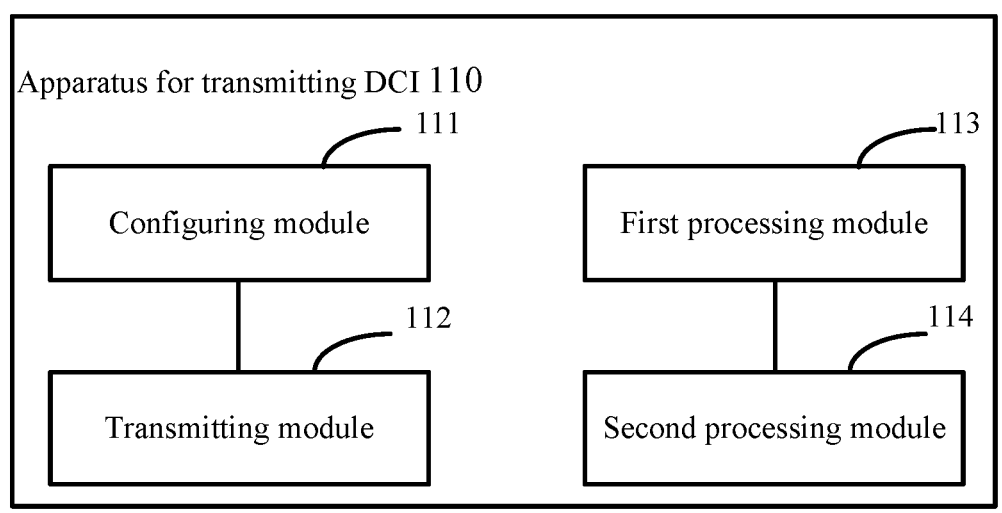
FIG. 11 is a schematic structural diagram of an apparatus for transmitting DCI according to a fourth embodiment of the invention.

FIG. 11 illustrates a schematic structural diagram of an apparatus 110 for transmitting DCI according to a fourth embodiment of the invention, where the apparatus includes followings.

A configuring module 111 is configured to configure the number of bits in a first indicating field in DCI, and to indicate the number of bits in the first indicating field to a transmitting module.

The transmitting module 112 is configured to transmit higher-layer signaling carrying configuration information indicating the number of bits in the first indicating field in the DCI; or the apparatus includes followings.

A first processing module 113 is configured to determine whether a UE is configured with information about an unlicensed component carrier.

A second processing module 114 is configured to determine the number of bits in a first indicating field in DCI according to whether the UE is configured with information about an unlicensed component carrier, where the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame.

Optionally the transmitting module 112 is further configured to transmit the DCI with the first indicating field including the number of bits to the UE, and to receive and parse Acknowledgement (ACK)/Non-Acknowledgement (NACK) information fed back by the UE, according to the first indicating field in the DCI.

Optionally the configuration information in the higher-layer signaling includes $\lceil \log_2 A \rceil$ bits of higher-layer signaling indicating the number of bits in the first indicating field, where the number of bits in the first indicating field is one of A numbers of bits, and A is a positive integer.

Optionally the maximum one of the A numbers of bits is $\lceil \log_2 N \times M \times C \rceil$, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or the maximum one of the A numbers of bits is $$\left\lceil \log_2 M \times \sum_{i=1}^{N} C_i \right\rceil,$$

where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the configuration information in the higher-layer signaling includes: K-bit higher-layer signaling indicating the number P of bits in the first indicating field; where K is 3, and P is one of the positive integers 1 to 8; or K is 3, and P is one of the positive integers 2 to 8; or K is 3, and P is one of the positive integers 2 to 7; or K is 2, and P is one of positive integers x1, x2, x3, and x4, where x1, x2, x3, and x4 are any four of the positive integers 1 to 8; or K is 1, and P is one of positive integers x1' and x2', where x1' and x2' are any two of the positive integers 1 to 8.

Optionally the second processing module 114 is configured:
when there is at least one unlicensed carrier configured, to determine the number of bits in the first indicating field as 5; otherwise, to determine the number of bits in the first indicating field as 2; or
when there is at least one unlicensed carrier configured, to determine the number of bits in the first indicating field as 6; otherwise, to determine the number of bits in the first indicating field as 2; or
when there is at least one unlicensed carrier configured, to determine the number of bits in the first indicating field as 7; otherwise, to determine the number of bits in the first indicating field as 2; or
when there is at least one unlicensed carrier configured, to determine the number of bits in the first indicating field as 8; otherwise, to determine the number of bits in the first indicating field as 2; or
when there is at least one unlicensed carrier configured, to determine the number of bits in the first indicating field as $\lceil \log_2 N \times M \times C \rceil$; otherwise, to determine the number of bits in the first indicating field as 2, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or
when there is at least one unlicensed carrier configured, to determine the number of bits in the first indicating field as $$\left\lceil \log_2 M \times \sum_{i=1}^{N} C_i \right\rceil;$$

otherwise, to determine the number of bits in the first indicating field as 2, where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the second processing module 114 is further configured: when a plurality of carrier groups are configured, to determine the number of bits in the first indicating field in the DCI of each carrier group respectively as in one of the ways above.

Optionally when the values of M are different for different uplink sub-frames and/or different component carriers, the maximum one of the respective values of M is taken.

Optionally the higher-layer signaling is Radio Resource Control (RRC) signaling or Media Access Control (MAC) signaling.

Fifth Embodiment

Figure 12:
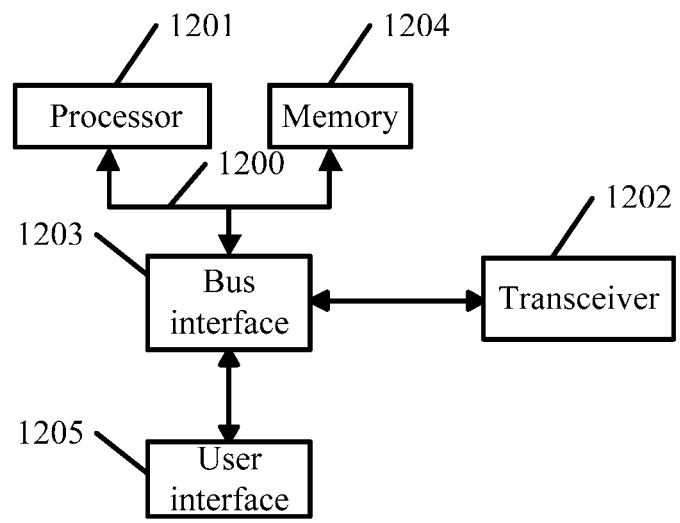
FIG. 12 is a schematic structural diagram of an apparatus for transmitting DCI according to a fifth embodiment of the invention.

FIG. 12 illustrates a schematic structural diagram of an apparatus for transmitting DCI according to a fifth embodiment of the invention, where the apparatus includes follows.

A processor 1201 is configured to read and execute program in a memory 1204 to determine information indicating the number of bits in a first indicating field in DCI, where the information includes configuration information in higher-layer signaling, or information about whether there is an unlicensed component carrier configured; and the first indicating field indicates the sum of the total number of Physical Downlink Control Channels (PDCCHs)/Enhanced Physical Downlink Control Channels (EPDCCHs), with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame; and to determine the number of bits in the first indicating field in the DCI according to the configuration information in the higher-layer signaling, or the information about whether there is an unlicensed component carrier configured.

Optionally the apparatus further includes: a transceiver 1202 is configured to be controlled by the processor 1201 to receive the DCI, with the first indicating field including the number of bits, transmitted by the eNB, and to generate and feed the Acknowledgement (ACK)/Non-Acknowledgement (NACK) information back to the eNB according to the first indicating field in the DCI.

Optionally the configuration information in the higher-layer signaling includes $\lceil \log_2 A \rceil$ bits of higher-layer signaling indicating the number of bits in the first indicating field, where the number of bits in the first indicating field is one of A numbers of bits, and A is a positive integer.

Optionally the maximum one of the A numbers of bits is $\lceil \log_2 N \times M \times C \rceil$, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or the maximum one of the A numbers of bits is $$\left\lceil \log_2 M \times \sum_{i=1}^{N} C_i \right\rceil,$$

where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the configuration information in the higher-layer signaling includes: K-bit higher-layer signaling indicating the number P of bits in the first indicating field; where K is 3, and P is one of the positive integers 1 to 8; or K is 3, and P is one of the positive integers 2 to 8; or K is 3, and P is one of the positive integers 2 to 7; or K is 2, and P is one of positive integers x1, x2, x3, and x4, where x1, x2, x3, and x4 are any four of the positive integers 1 to 8; or K is 1, and P is one of positive integers x1' and x2', where x1' and x2' are any two of the positive integers 1 to 8.

Optionally the processor 1201 is configured:
when there is at least one unlicensed carrier configured, to determine the number of bits in the first indicating field as 5; otherwise, to determine the number of bits in the first indicating field as 2; or
when there is at least one unlicensed carrier configured, to determine the number of bits in the first indicating field as 6; otherwise, to determine the number of bits in the first indicating field as 2; or
when there is at least one unlicensed carrier configured, to determine the number of bits in the first indicating field as 7; otherwise, to determine the number of bits in the first indicating field as 2; or
when there is at least one unlicensed carrier configured, to determine the number of bits in the first indicating field as 8; otherwise, to determine the number of bits in the first indicating field as 2; or
when there is at least one unlicensed carrier configured, to determine the number of bits in the first indicating field as $\lceil \log_2 N \times M \times C \rceil$; otherwise, to determine the number of bits in the first indicating field as 2, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or
when there is at least one unlicensed carrier configured, to determine the number of bits in the first indicating field as $$\left\lceil \log_2 M \times \sum_{i=1}^{N} C_i \right\rceil;$$

otherwise, to determine the number of bits in the first indicating field as 2, where N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

Optionally the processor 1201 is further configured: when a plurality of carrier groups are configured, to determine the number of bits in the first indicating field in the DCI of each carrier group respectively as in one of the ways above.

Optionally when the values of M are different for different uplink sub-frames and/or different component carriers, the maximum one of the respective values of M is taken.

Optionally the higher-layer signaling is Radio Resource Control (RRC) signaling or Media Access Control (MAC) signaling.

In FIG. 12, in a bus architecture (represented by a bus 1200), the bus 1200 can include any number of interconnecting buses and bridges to particularly link together various circuits including one or more processors represented by the processor 1201, and one or more memories represented by the memory 1204. The bus 1200 can further link together various other circuits, e.g., peripheral devices, manostats, power management circuits, etc., all of which are well known in the art, so a further description thereof will be omitted in this context. A bus interface 1203 serves as an interface between the bus 1200 and the transceiver 1202. The transceiver 1202 can be an element, or a number of elements, e.g., a number of transmitters and receivers, which are units for communication with various other devices over a transmission medium. For example, the transceiver 1202 receives external data from another device. The transceiver 1202 is configured to transmit data processed by the processor 1201 to the other device. A user interface 1205, e.g., a keypad, a display, a loudspeaker, a microphone, a joystick, etc., can be further provided dependent upon the nature of a computing system.

The processor 1201 is responsible for managing the bus 1200 and performing normal processes, e.g., running a general operating system as described above. The memory 1204 can store data for use by the processor 1201 in performing the operations.

Optionally the processor 1201 can be a Central Processing Unit (CPU), an Application Specific Integrated Circuit (ASIC), a Field-Programmable Gate Array (FPGA), or a Complex Programmable Logic Device (CPLD).

Sixth Embodiment

Figure 13:
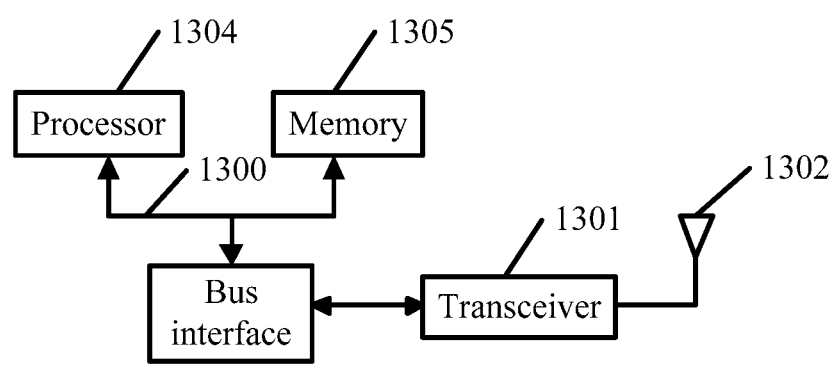
FIG. 13 is a schematic structural diagram of an apparatus for transmitting DCI according to a sixth embodiment of the invention.

FIG. 13 illustrates a schematic structural diagram of an apparatus for transmitting DCI according to a sixth embodiment of the invention, where the apparatus includes follows.

A processor 1304 is configured to read and execute program in a memory 1305 to determine the number of bits in a first indicating field in DCI, and to transmit higher-layer signaling to a UE through a transceiver 1301, where the higher-layer signaling carries configuration information indicating the number of bits in the first indicating field in the DCI, or to determine the number of bits in a first indicating field in DCI according to whether the UE is configured with information about an unlicensed component carrier, where the first indicating field indicates the sum of the total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame; and the transceiver 1301 is configured to be controlled by the processor 1304 to receive and transmit data.

Optionally the transceiver 1301 is further configured: to transmit the DCI with the first indicating field including the number of bits to the UE, and to receive and parse Acknowledgement (ACK)/Non-Acknowledgement (NACK) information fed back by the UE, according to the first indicating field in the DCI.

Optionally the configuration information in the higher-layer signaling includes $\lceil \log_2 A \rceil$ bits of higher-layer signaling indicating the number of bits in the first indicating field, where the number of bits in the first indicating field is one of A numbers of bits, and A is a positive integer.

Optionally the maximum one of the A numbers of bits is $\lceil \log_2 N \times M \times C \rceil$, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or the maximum one of the A numbers of bits is $$\left\lceil \log_2 M \times \sum_{i=1}^{N} C_i \right\rceil,$$

where N is the number of configured component carriers, or N=32; M is the number of sub-frames for which ACK/NACK information is to be fed back in the same uplink sub-frame; and $C_i$ is the number of feedback information bits corresponding to a component carrier i, and if multi-TB transmission is used for the component carrier i, and a spatial bundling is not used for ACK/NACK of multiple TBs in the same sub-frame, then $C_i=2$; otherwise, $C_i=1$.

Optionally the configuration information in the higher-layer signaling includes: K-bit higher-layer signaling indicating the number P of bits in the first indicating field; where K is 3, and P is one of the positive integers 1 to 8; or K is 3, and P is one of the positive integers 2 to 8; or K is 3, and P is one of the positive integers 2 to 7; or K is 2, and P is one of positive integers x1, x2, x3, and x4, where x1, x2, x3, and x4 are any four of the positive integers 1 to 8; or K is 1, and P is one of positive integers x1' and x2', where x1' and x2' are any two of the positive integers 1 to 8.

Optionally the processor 1304 is configured:
when there is at least one unlicensed carrier configured, to determine the number of bits in the first indicating field as 5; otherwise, to determine the number of bits in the first indicating field as 2; or
when there is at least one unlicensed carrier configured, to determine the number of bits in the first indicating field as 6; otherwise, to determine the number of bits in the first indicating field as 2; or
when there is at least one unlicensed carrier configured, to determine the number of bits in the first indicating field as 7; otherwise, to determine the number of bits in the first indicating field as 2; or
when there is at least one unlicensed carrier configured, to determine the number of bits in the first indicating field as 8; otherwise, to determine the number of bits in the first indicating field as 2; or
when there is at least one unlicensed carrier configured, to determine the number of bits in the first indicating field as $\lceil \log_2 N \times M \times C \rceil$; otherwise, to determine the number of bits in the first indicating field as 2, where N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or
when there is at least one unlicensed carrier configured, to determine the number of bits in the first indicating field as $$\left\lceil \log_2 M \times \sum_{i=1}^{N} C_i \right\rceil;$$

otherwise, to determine the number of bits in the first indicating field as 2, where N is the number of configured component carriers, or N=32; M is the number of sub-frames for which ACK/NACK information is to be fed back in the same uplink sub-frame; and $C_i$ is the number of feedback information bits corresponding to a component carrier i, and if multi-TB transmission is used for the component carrier i, and a spatial bundling is not used for ACK/NACK of multiple TBs in the same sub-frame, then $C_i=2$; otherwise, $C_i=1$.

Optionally the processor 1304 is further configured: when a plurality of carrier groups are configured, to determine the number of bits in the first indicating field in the DCI of each carrier group respectively as in one of the ways above.

Optionally when the values of M are different for different uplink sub-frames and/or different component carriers, the maximum one of the respective values of M is taken.

Optionally the higher-layer signaling is Radio Resource Control (RRC) signaling or Media Access Control (MAC) signaling.

In FIG. 13, in a bus architecture (represented by a bus 1300), the bus 1300 can include any number of interconnecting buses and bridges to particularly link together various circuits including one or more processors represented by the processor 1304, and one or more memories represented by the memory 1305. The bus 1300 can further link together various other circuits, e.g., prophetical devices, manostats, power management circuits, etc., all of which are well known in the art, so a further description thereof will be omitted in this context. A bus interface 1303 serves as an interface between the bus 1300 and the transceiver 1301. The transceiver 1301 can be an element, or a number of elements, e.g., a number of transmitters and receivers, which are units for communication with various other devices over a transmission medium. Data processed by the processor 1304 are transmitted over a wireless medium through an antenna 1302, and furthermore data are received by and conveyed through the antenna 1302 to the processor 1304.

The processor 1304 is responsible for managing the bus 1300 and performing normal processes, and can further provide various functions including timing, a peripheral interface, voltage regulation, power supply management, and other control functions. The memory 1305 can store data for use by the processor 1304 in performing the operations.

Optionally the processor 1304 can be a Central Processing Unit (CPU), an Application Specific Integrated Circuit (ASIC), a Field-Programmable Gate Array (FPGA), or a Complex Programmable Logic Device (CPLD).

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting Downlink Control Information (DCI), the method comprising:
determining information indicating a number of bits in a first indicating field in DCI, wherein the information comprises configuration information in higher-layer signaling, or information about whether there is an unlicensed component carrier configured; and the first indicating field indicates a sum of a total number of Physical Downlink Control Channels (PDCCHs)/Enhanced Physical Downlink Control Channels (EPDCCHs), with assigned Physical Downlink Shared Channels (PDSCHs), and a number of PDCCHs/EPDCCHs indicating downlink Semi-Persistent Scheduling (SPS) resource release, up to a present sub-frame, up to a present sub-frame; or the first indicating field indicates a sum of a total number of Transport Blocks (TBs), and a number of PDCCHs/EPDCCHs indicating downlink SPS resource release, up to a present sub-frame; and
determining the number of bits in the first indicating field in the DCI according to the configuration information in the higher-layer signaling, or the information about whether there is an unlicensed component carrier configured;
wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer; or
the configuration information in the higher-layer signaling comprises:
K-bit higher-layer signaling indicating the number P of bits in the first indicating field;
wherein K is 3, and P is one of the positive integers 1 to 8;
K is 3, and P is one of the positive integers 2 to 8;
K is 3, and P is one of the positive integers 2 to 7;
K is 2, and P is one of positive integers x1, x2, x3, and x4, wherein x1, x2, x3, and x4 are any four of the positive integers 1 to 8;
K is 1, and P is one of positive integers x1' and x2', wherein x1' and x2' are any two of the positive integers 1 to 8;
wherein a maximum value of the A numbers of bits is calculated by expression 1 or expression 2 as follows:
expression 1: $\lceil \log_2 N \times M \times C \rceil$, wherein
N is the number of configured component carriers, M is the number of sub-frames for which ACK/NACK information is to be fed back in the same uplink sub-frame, and C=2,
or
N is the number of configured component carriers, M is the number of sub-frames for which ACK/NACK information is to be fed back in the same uplink sub-frame, and C=1,
or
N=32, M is the number of sub-frames for which ACK/NACK information is to be fed back in the same uplink sub-frame, and C=2,
or
N=32, M is the number of sub-frames for which ACK/NACK information is to be fed back in the same uplink sub-frame, and C=1,
or
N is the number of configured component carriers, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1,
or
N=32, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1;
or
expression 2:

$$\left\lceil \log_2 M \times \sum_{i=1}^{N} C_i \right\rceil,$$

wherein:
N is the number of configured component carriers, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1, or N=32, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

2. The method according to claim 1, wherein the determining information indicating the number of bits in the first indicating field in the DCI according to the information about whether there is an unlicensed component carrier configured comprises:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

3. The method according to claim 1, wherein the method further comprises:

when a plurality of carrier groups are configured, determining the number of bits in the first indicating field in the DCI of each carrier group respectively by determining the number of bits in the first indicating field in the DCI according to the configuration information in the higher-layer signaling;

wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer; or the configuration information in the higher-layer signaling comprises:

K-bit higher-layer signaling indicating the number P of bits in the first indicating field;

wherein K is 3, and P is one of the positive integers 1 to 8; or

K is 3, and P is one of the positive integers 2 to 8; or

K is 3, and P is one of the positive integers 2 to 7; or

K is 2, and P is one of positive integers x1, x2, x3, and x4, wherein x1, x2, x3, and x4 are any four of the positive integers 1 to 8; or K is 1, and P is one of positive integers x1' and x2', wherein x1' and x2' are any two of the positive integers 1 to 8;

wherein a maximum one of the A numbers of bits is $\lceil \log_2 N \times M \times C \rceil$, wherein N is the number of configured component carriers, or N=32; M is the number of sub-frames for which ACK/NACK information is to be fed back in the same uplink sub-frame; and C=2, or C=1, or if there is at least one carrier with multi-TB transmission and a spatial bundling is not used for ACK/NACK of multiple TBs in the same sub-frame, then C=2; otherwise, C=1; or a maximum one of the A numbers of bits is $$\left\lceil \log_2 M \times \sum_{i=1}^{N} C_i \right\rceil,$$

wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1;

or the method further comprises:

when a plurality of carrier groups are configured, determining the number of bits in the first indicating field in the DCI of each carrier group respectively by:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

4. The method according to claim 2, wherein when the values of M are different for different uplink sub-frames and/or different component carriers, the maximum one of the respective values of M is taken.

5. A method for transmitting Downlink Control Information (DCI), the method comprising:

determining the number of bits in a first indicating field in DCI, and transmitting higher-layer signaling to a UE, wherein the higher-layer signaling carries configuration information indicating the number of bits in the first indicating field in the DCI, or determining the number of bits in a first indicating field in DCI according to whether the UE is configured with information about an unlicensed component carrier, wherein the first indicating field indicates the sum of a total number of PDCCHs/EPDCCHs, with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates the sum of the total number of Transport Blocks (TBs), and the number of PDCCHs/EPDCCHs indicating downlink SPS resource release, up to a present sub-frame;

wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer;

or the configuration information in the higher-layer signaling comprises:

K-bit higher-layer signaling indicating the number P of bits in the first indicating field;

wherein K is 3, and P is one of the positive integers 1 to 8;

K is 3, and P is one of the positive integers 2 to 8;

K is 3, and P is one of the positive integers 2 to 7;

K is 2, and P is one of positive integers x1, x2, x3, and x4, wherein x1, x2, x3, and x4 are any four of the positive integers 1 to 8; or K is 1, and P is one of positive integers x1' and x2', wherein x1' and x2' are any two of the positive integers 1 to 8;

wherein a maximum value of the A numbers of bits is calculated by expression 1 or expression 2 as follows:

expression 1: $\lceil \log_2 N \times M \times C \rceil$, wherein

N is the number of configured component carriers, M is the number of sub-frames for which ACK/NACK information is to be fed back in the same uplink sub-frame, and C=2, or N is the number of configured component carriers, M is the number of sub-frames for which ACK/NACK information is to be fed back in the same uplink sub-frame, and C=1, or N=32, M is the number of sub-frames for which ACK/NACK information is to be fed back in the same uplink sub-frame, and C=2, or N=32, M is the number of sub-frames for which ACK/NACK information is to be fed back in the same uplink sub-frame, and C=1, or N is the number of configured component carriers, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1, or N=32, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1;

or expression 2:

$$\left\lceil \log_2 M \times \sum_{i=1}^{N} C_i \right\rceil,$$

wherein:

N is the number of configured component carriers, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1, or N=32, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

6. The method according to claim 5, wherein the determining information indicating the number of bits in the first indicating field in the DCI according to the information about whether there is an unlicensed component carrier configured comprises:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

7. The method according to claim 5, wherein the method further comprises:

when a plurality of carrier groups are configured, determining the number of bits in the first indicating field in the DCI of each carrier group respectively by determining the number of bits in a first indicating field in DCI, and transmitting higher-layer signaling to a UE;

wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer; or the configuration information in the higher-layer signaling comprises:

K-bit higher-layer signaling indicating the number P of bits in the first indicating field;

wherein K is 3, and P is one of the positive integers 1 to 8; or

K is 3, and P is one of the positive integers 2 to 8; or

K is 3, and P is one of the positive integers 2 to 7; or

K is 2, and P is one of positive integers x1, x2, x3, and x4, wherein x1, x2, x3, and x4 are any four of the positive integers 1 to 8; or K is 1, and P is one of positive integers x1' and x2', wherein x1' and x2' are any two of the positive integers 1 to 8;

wherein a maximum one of the A numbers of bits is $\lceil \log_2 N \times M \times C \rceil$, wherein N is the number of configured component carriers, or N=32; M is the number of sub-frames for which ACK/NACK information is to be fed back in the same uplink sub-frame; and C=2, or C=1, or if there is at least one carrier with multi-TB transmission and a spatial bundling is not used for ACK/NACK of multiple TBs in the same sub-frame, then C=2; otherwise, C=1; or a maximum one of the A numbers of bits is $$\left\lceil \log_2 M \times \sum_{i=1}^{N} C_i \right\rceil,$$

wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1;

or the method further comprises:

when a plurality of carrier groups are configured, determining the number of bits in the first indicating field in the DCI of each carrier group respectively by:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

8. The method according to claim 6, wherein when the values of M are different for different uplink sub-frames and/or different component carriers, the maximum one of the respective values of M is taken.

9. An apparatus for transmitting Downlink Control Information (DCI), the apparatus comprising a memory and at least one processor; the at least one processor is configured to read and execute a computer-readable program in the memory to:

determine information indicating a number of bits in a first indicating field in DCI, wherein the information comprises configuration information in higher-layer signaling, or information about whether there is an unlicensed component carrier configured; and the first indicating field indicates a sum of a total number of Physical Downlink Control Channels (PDCCHs)/Enhanced Physical Downlink Control Channels (EPDCCHs), with assigned Physical Downlink Shared Channels (PDSCHs), and the number of PDCCHs/EPDCCHs indicating downlink Semi-Persistent Scheduling (SPS) resource release, up to a present sub-frame; or the first indicating field indicates a sum of a total number of Transport Blocks (TBs) and a number of PDCCHs/EPDCCHs indicating downlink SPS resource release, up to a present sub-frame; and determine the number of bits in the first indicating field in the DCI according to the configuration information in the higher-layer signaling, or the information about whether there is an unlicensed component carrier configured;

wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer;

or the configuration information in the higher-layer signaling comprises:

K-bit higher-layer signaling indicating the number P of bits in the first indicating field;

wherein K is 3, and P is one of the positive integers 1 to 8;

K is 3, and P is one of the positive integers 2 to 8;

K is 3, and P is one of the positive integers 2 to 7;

K is 2, and P is one of positive integers x1, x2, x3, and x4, wherein x1, x2, x3, and x4 are any four of the positive integers 1 to 8; or K is 1, and P is one of positive integers x1' and x2', wherein x1' and x2' are any two of the positive integers 1 to 8;

wherein a maximum value of the A numbers of bits is calculated by expression 1 or expression 2 as follows:

expression 1: $\lceil \log_2 N \times M \times C \rceil$, wherein

N is the number of configured component carriers, M is the number of sub-frames for which ACK/NACK information is to be fed back in the same uplink sub-frame, and C=2, or N is the number of configured component carriers, M is the number of sub-frames for which ACK/NACK information is to be fed back in the same uplink sub-frame, and C=1, or N=32, M is the number of sub-frames for which ACK/NACK information is to be fed back in the same uplink sub-frame, and C=2, or N=32, M is the number of sub-frames for which ACK/NACK information is to be fed back in the same uplink sub-frame, and C=1, or N is the number of configured component carriers, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1, or N=32, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1;

or expression 2:

$$\left\lceil \log_2 M \times \sum_{i=1}^{N} C_i \right\rceil,$$

wherein:

N is the number of configured component carriers, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1, or N=32, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

10. The apparatus according to claim 9, wherein the at least one processor is configured to read and execute the computer-readable program in the memory:

when there is at least one unlicensed carrier configured, to determine the number of bits in the first indicating field as 5; otherwise, to determine the number of bits in the first indicating field as 2; or when there is at least one unlicensed carrier configured, to determine the number of bits in the first indicating field as 6; otherwise, to determine the number of bits in the first indicating field as 2; or when there is at least one unlicensed carrier configured, to determine the number of bits in the first indicating field as 7; otherwise, to determine the number of bits in the first indicating field as 2; or when there is at least one unlicensed carrier configured, to determine the number of bits in the first indicating field as 8; otherwise, to determine the number of bits in the first indicating field as 2; or when there is at least one unlicensed carrier configured, to determine the number of bits in the first indicating field as $\lceil \log_2 N \times M \times C \rceil$; otherwise, to determine the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, to determine the number of bits in the first indicating field as $$\left\lceil \log_2 M \times \sum_{i=1}^{N} C_i \right\rceil;$$

otherwise, to determine the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

11. The apparatus according to claim 9, wherein the at least one processor is further configured to read and execute the computer-readable program in the memory:

when a plurality of carrier groups are configured, to determine the number of bits in the first indicating field in the DCI of each carrier group respectively by determining the number of bits in the first indicating field in the DCI according to the configuration information in the higher-layer signaling;

wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer; or the configuration information in the higher-layer signaling comprises:

K-bit higher-layer signaling indicating the number P of bits in the first indicating field;

wherein K is 3, and P is one of the positive integers 1 to 8; or

K is 3, and P is one of the positive integers 2 to 8; or

K is 3, and P is one of the positive integers 2 to 7; or

K is 2, and P is one of positive integers x1, x2, x3, and x4, wherein x1, x2, x3, and x4 are any four of the positive integers 1 to 8; or K is 1, and P is one of positive integers x1' and x2', wherein x1' and x2' are any two of the positive integers 1 to 8;

wherein a maximum one of the A numbers of bits is $\lceil \log_2 N \times M \times C \rceil$, wherein N is the number of configured component carriers, or N=32; M is the number of sub-frames for which ACK/NACK information is to be fed back in the same uplink sub-frame; and C=2, or C=1, or if there is at least one carrier with multi-TB transmission and a spatial bundling is not used for ACK/NACK of multiple TBs in the same sub-frame, then C=2; otherwise, C=1; or a maximum one of the A numbers of bits is $$\left\lceil \log_2 M \times \sum_{i=1}^{N} C_i \right\rceil,$$

wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1;

or when a plurality of carrier groups are configured, to determine the number of bits in the first indicating field in the DCI of each carrier group respectively by:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK.

12. The apparatus according to claim 10, wherein the at least one processor is configured to read and execute the computer-readable program in the memory:
when the values of M are different for different uplink sub-frames and/or different component carriers, to take the maximum one of the respective values of M.

13. An apparatus for transmitting Downlink Control Information (DCI), the apparatus comprising: a memory and at least one processor; the at least one processor is configured to read and execute a computer-readable program in the memory to:
configure a number of bits in a first indicating field in DCI, and indicate the number of bits in the first indicating field; and
transmit higher-layer signaling to a UE, wherein the higher-layer signaling carries configuration information indicating the number of bits in the first indicating field in the DCI;
or
the apparatus comprises: a memory and at least one processor; the at least one processor is configured to read and execute a computer-readable program in the memory to:
determine whether a UE is configured with information about an unlicensed component carrier; and
determine the number of bits in a first indicating field in DCI according to whether the UE is configured with information about an unlicensed component carrier, wherein the first indicating field indicates a sum of a total number of PDCCHs/EPDCCHs, with assigned Physical Downlink Shared Channels (PDSCHs), and a number of PDCCHs/EPDCCHs indicating downlink Semi-Persistent Scheduling (SPS) resource release, up to a present sub-frame; or the first indicating field indicates a sum of a total number of Transport Blocks (TBs) and the number of PDCCHs/EPDCCHs indicating downlink SPS resource release, up to a present sub-frame;
wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer; or
the configuration information in the higher-layer signaling comprises:
K-bit higher-layer signaling indicating the number P of bits in the first indicating field;
wherein K is 3, and P is one of the positive integers 1 to 8; or
K is 3, and P is one of the positive integers 2 to 8; or
K is 3, and P is one of the positive integers 2 to 7; or
K is 2, and P is one of positive integers x1, x2, x3, and x4, wherein x1, x2, x3, and x4 are any four of the positive integers 1 to 8; or
K is 1, and P is one of positive integers x1' and x2', wherein x1' and x2' are any two of the positive integers 1 to 8;
wherein a maximum value of the A numbers of bits is calculated by expression 1 or expression 2 as follows:
expression 1: $\lceil \log_2 N \times M \times C \rceil$, wherein
N is the number of configured component carriers, M is the number of sub-frames for which ACK/NACK information is to be fed back in the same uplink sub-frame, and C=2,
or
N is the number of configured component carriers, M is the number of sub-frames for which ACK/NACK information is to be fed back in the same uplink sub-frame, and C=1,
or
N=32, M is the number of sub-frames for which ACK/NACK information is to be fed back in the same uplink sub-frame, and C=2,
or
N=32, M is the number of sub-frames for which ACK/NACK information is to be fed back in the same uplink sub-frame, and C=1,
or
N is the number of configured component carriers, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1,
or
N=32, M is the number of sub-frames for which ACK/NACK information is to be fed back in the same uplink sub-frame, if there is at least one carrier with multi-TB transmission and a spatial bundling is not used for ACK/NACK of multiple TBs in the same sub-frame, then C=2; otherwise, C=1;
or
expression 2:

$$\left\lceil \log_2 M \times \sum_{i=1}^{N} C_i \right\rceil,$$

wherein:
N is the number of configured component carriers, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1, or N=32, M is the number of sub-frames for which ACK/NACK information is to be fed back in the same uplink sub-frame, and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

14. The apparatus according to claim 13, wherein the at least one processor is configured to read and execute the computer-readable program in the memory:

when there is at least one unlicensed carrier configured, to determine the number of bits in the first indicating field as 5; otherwise, to determine the number of bits in the first indicating field as 2; or when there is at least one unlicensed carrier configured, to determine the number of bits in the first indicating field as 6; otherwise, to determine the number of bits in the first indicating field as 2; or when there is at least one unlicensed carrier configured, to determine the number of bits in the first indicating field as 7; otherwise, to determine the number of bits in the first indicating field as 2; or when there is at least one unlicensed carrier configured, to determine the number of bits in the first indicating field as 8; otherwise, to determine the number of bits in the first indicating field as 2; or when there is at least one unlicensed carrier configured, to determine the number of bits in the first indicating field as $\lceil \log_2 N \times M \times C \rceil$; otherwise, to determine the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, to determine the number of bits in the first indicating field as $$\left\lceil \log_2 M \times \sum_{i=1}^{N} C_i \right\rceil;$$

otherwise, to determine the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1.

15. The apparatus according to claim 13, wherein the at least one processor is further configured to read and execute the computer-readable program in the memory:

when a plurality of carrier groups are configured, to determine the number of bits in the first indicating field in the DCI of each carrier group by configuring a number of bits in a first indicating field in DCI, and indicating the number of bits in the first indicating field; and transmitting higher-layer signaling to a UE;

wherein the configuration information in the higher-layer signaling comprises $\lceil \log_2 A \rceil$ bits of higher-layer signaling indicating the number of bits in the first indicating field, wherein the number of bits in the first indicating field is one of A numbers of bits, and A is a positive integer; or the configuration information in the higher-layer signaling comprises:

K-bit higher-layer signaling indicating the number P of bits in the first indicating field;

wherein K is 3, and P is one of the positive integers 1 to 8; or

K is 3, and P is one of the positive integers 2 to 8; or

K is 3, and P is one of the positive integers 2 to 7; or

K is 2, and P is one of positive integers x1, x2, x3, and x4, wherein x1, x2, x3, and x4 are any four of the positive integers 1 to 8; or K is 1, and P is one of positive integers x1' and x2', wherein x1' and x2' are any two of the positive integers 1 to 8;

wherein a maximum one of the A numbers of bits is $\lceil \log_2 N \times M \times C \rceil$, wherein N is the number of configured component carriers, or N=32; M is the number of sub-frames for which ACK/NACK information is to be fed back in the same uplink sub-frame; and C=2, or C=1, or if there is at least one carrier with multi-TB transmission and a spatial bundling is not used for ACK/NACK of multiple TBs in the same sub-frame, then C=2; otherwise, C=1; or a maximum one of the A numbers of bits is $$\left\lceil \log_2 M \times \sum_{i=1}^{N} C_i \right\rceil,$$

wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK of multiple TBs in the same sub-frame, then Ci=2; otherwise, Ci=1;

or when a plurality of carrier groups are configured, to determine the number of bits in the first indicating field in the DCI of each carrier group respectively by:

when there is at least one unlicensed carrier configured, determining the number of bits in the first indicating field as 5; otherwise, determining the number of bits in the first indicating field as 2; or when there is at least one unlicensed carrier configured, determining the number of bits in the first indicating field as 6; otherwise, determining the number of bits in the first indicating field as 2; or when there is at least one unlicensed carrier configured, determining the number of bits in the first indicating field as 7; otherwise, determining the number of bits in the first indicating field as 2; or when there is at least one unlicensed carrier configured, determining the number of bits in the first indicating field as 8; otherwise, to determine the number of bits in the first indicating field as 2; or when there is at least one unlicensed carrier configured, determining the number of bits in the first indicating field as $\lceil \log_2 N \times M \times C \rceil$; otherwise, determining the number of bits in the first indicating field as 2, wherein N is the number of configured component carriers, or N=32; M is the number of sub-frames for which ACK/NACK information is to be fed back in the same uplink sub-frame; and C=2, or C=1, or if there is at least one carrier with multi-TB transmission, and a spatial bundling is not used for ACK/NACK of multiple TBs in the same sub-frame, then C=2; otherwise, C=1; or when there is at least one unlicensed carrier configured, determining the number of bits in the first indicating field as $$\left\lceil \log_2 M \times \sum_{i=1}^{N} C_i \right\rceil;$$

otherwise, determining the number of bits in the first indicating field as 2, wherein N is the number of configured component carriers, or N=32; M is the number of sub-frames for which ACK/NACK information is to be fed back in the same uplink sub-frame; and Ci is the number of feedback information bits corresponding to a component carrier i, and if multi-TB transmission is used for the component carrier i, and a spatial bundling is not used for ACK/NACK.

16. The apparatus according to claim 14, wherein the at least one processor is configured to read and execute the computer-readable program in the memory:

when the values of M are different for different uplink sub-frames and/or different component carriers, to take the maximum one of the respective values of M.

* * * * *